(12) United States Patent
Katsuki et al.

(10) Patent No.: US 7,184,029 B2
(45) Date of Patent: Feb. 27, 2007

(54) TOUCH PANEL DEVICE

(75) Inventors: Takashi Katsuki, Kawasaki (JP); Fumihiko Nakazawa, Kawasaki (JP); Satoshi Sano, Kawasaki (JP); Yuji Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 488 days.

(21) Appl. No.: 10/704,778

(22) Filed: Nov. 12, 2003

(65) Prior Publication Data
US 2004/0104827 A1    Jun. 3, 2004

(30) Foreign Application Priority Data
Nov. 19, 2002    (JP) .............. 2002-335478

(51) Int. Cl.
G06F 3/043 (2006.01)
H01L 41/04 (2006.01)
H01L 41/08 (2006.01)
H01L 41/18 (2006.01)
H02N 2/00 (2006.01)
G09G 5/00 (2006.01)

(52) U.S. Cl. .............. 345/173; 178/18.04; 310/313 R; 310/313 A; 310/313 B; 345/177

(58) Field of Classification Search ................. 345/173, 345/177
See application file for complete search history.

(56) References Cited

U.S. PATENT DOCUMENTS 4,602,183 A    7/1986  Okamoto et al.
RE33,151 E    1/1990  Adler
4,908,542 A    3/1990  Solie (Continued)

FOREIGN PATENT DOCUMENTS

EP    0 332 410 A2    9/1989

(Continued)

OTHER PUBLICATIONS

Japanese Search Report dated Apr. 4, 2006, issued in corresponding Japanese Patent Application No. 2002-335478.

(Continued)

*Primary Examiner*—Sumati Lefkowitz
*Assistant Examiner*—Alexander S. Beck
(74) *Attorney, Agent, or Firm*—Westerman, Hattori, Daniels & Adrian, LLP.

(57) ABSTRACT

Each of an excitation element for exciting surface acoustic waves in two directions and a receiving element for receiving surface acoustic waves from two directions is constructed by forming a comb-like electrode on the front surface of a piezoelectric body in the form of a thin film and a plate electrode on the rear surface thereof. The comb-like electrode on the front surface has one line of bus electrode, and a plurality of electrode fingers which are extended from the bus electrode and bent in V-shape in the middle. The voltage in the excitation element and in the receiving element is controlled by providing a terminal resistance for preventing reflection of an applied AC voltage at the terminal end, between the terminal end portion of the comb-like electrode and the plate electrode, or adjusting the resistance value of the bus electrode and/or the plate electrode, or adjusting the capacitance value between the electrode finger and the plate electrode.

15 Claims, 26 Drawing Sheets

U.S. PATENT DOCUMENTS

| | | | |
|---|---|---|---|
| 5,717,434 A * | 2/1998 | Toda | 345/177 |
| 5,767,608 A | 6/1998 | Toda | |
| 5,883,457 A * | 3/1999 | Rinde et al. | 310/313 D |
| 5,886,452 A | 3/1999 | Toda | |
| 5,986,224 A | 11/1999 | Kent | |
| 5,994,817 A | 11/1999 | Toda | |
| 6,023,122 A | 2/2000 | Liu et al. | |
| 6,078,315 A | 6/2000 | Huang | |
| 6,091,406 A | 7/2000 | Kambara et al. | |
| 6,426,583 B1 | 7/2002 | Onishi et al. | |
| 6,750,853 B2 | 6/2004 | Takahashi et al. | |
| 6,756,973 B2 | 6/2004 | Sano et al. | |
| 2002/0101408 A1 * | 8/2002 | Sano et al. | 345/173 |
| 2003/0011577 A1 | 1/2003 | Katsuki et al. | |
| 2003/0038789 A1 | 2/2003 | Nakazawa et al. | |
| 2003/0234773 A1 | 12/2003 | Sano et al. | |
| 2004/0027342 A1 | 2/2004 | Katsuki et al. | |
| 2004/0104827 A1 | 6/2004 | Katsuki et al. | |
| 2005/0073505 A1 | 4/2005 | Katsuki et al. | |

FOREIGN PATENT DOCUMENTS

| | | |
|---|---|---|
| JP | 06-075688 | 3/1994 |
| JP | 06 384396 A | 12/1994 |
| JP | 07-210300 | 8/1995 |
| JP | 07-273595 A | 10/1995 |
| JP | 09-049994 | 2/1997 |
| JP | 10-055240 | 2/1998 |
| JP | 10-504414 | 4/1998 |
| JP | 10-163803 | 6/1998 |
| JP | 2002-222041 A | 8/2002 |

OTHER PUBLICATIONS

Platshon M; "Surface Acoustic Wave Technology Expands Uses of Touch-Screen" Computer Technology Review, Westworld Production Co., Los Angeles, US, vol. 77, No. 13(Sep. 21, 87) pp. 18-21.

* cited by examiner

TOUCH PANEL DEVICE

BACKGROUND OF THE INVENTION

The present invention relates to a touch panel device for detecting the contact of an object, such as a finger or a pen, with the touch panel device, and more particularly relates to a touch panel device for detecting the contact position of the object by detecting attenuation and cutoff of surface acoustic waves (SAWs) by using an excitation element and a receiving element, each constructed by forming electrodes on a piezoelectric body.

With the spread of computer systems, mainly personal computers, there is used a device for inputting new information or giving various instructions to a computer system by pointing at a position on the display screen of a display device on which information is displayed by the computer system, with an object such as a finger or a pen. In order to perform an input operation with respect to the information displayed on the display screen of the display device of a personal computer or the like by a touching method, it is necessary to detect the contact position (pointed position) on the display screen with high accuracy.

Well known examples of a touch panel device for detecting the contact position of an object such as a finger or a pen are a device using a resistance film, and a device using ultrasonic waves. The former device using a resistance film detects a change in the resistance value of the resistance film caused by contact of the object with the resistance film. This device has the advantage of low consumption of power, but has problems in the aspects of the response time, detection performance and durability.

By contrast, in the device using ultrasonic waves, the contact position of an object such as a finger or a pen is detected by propagating surface acoustic waves on a non-piezoelectric substrate, for example, and detecting attenuation of surface acoustic waves caused by contact of the object with the non-piezoelectric substrate. A variety of such touch panel devices have been proposed (for example, Japanese Patent Application Laid-Open Nos. 6-75688/1994 and 10-55240/1998, and Published Japanese Translation of PCT International Application No. 10-504414/1998).

Regarding a touch panel device using surface acoustic waves, there was developed a touch panel device which uses, as transducers, comb-like electrodes (IDTs: inter digital transducers) that can be produced collectively using a photolithography technique. In this touch panel device, an element constructed by forming a comb-like electrode on a piezoelectric body in the form of a thin film is used as an excitation element for exciting a surface acoustic wave and a receiving element for receiving a propagated surface acoustic wave.

FIG. 1 is an illustration showing the configuration of such a conventional touch panel device using comb-like electrodes. In FIG. 1, the numeral 61 represents a rectangular non-piezoelectric substrate. A plurality of excitation elements 62, each constructed by forming a comb-like electrode on a piezoelectric thin film, for exciting surface acoustic waves are arranged in a line on one end of each of the X-direction and the Y-direction of the non-piezoelectric substrate 61. Moreover, a plurality of receiving elements 63, each constructed by forming a comb-like electrode on a piezoelectric thin film, for receiving surface acoustic waves are arranged in a line on the other end of each of the X-direction and the Y-direction of the non-piezoelectric substrate 61.

In this touch panel device, a periodic signal is inputted to each excitation element 62 to excite surface acoustic waves and propagate them on the non-piezoelectric substrate 61, and then the propagated surface acoustic waves are received by the respective receiving elements 63. When an object such as a finger or a pen is in contact with the propagation path of a surface acoustic wave on the non-piezoelectric substrate 61, the surface acoustic wave attenuates. Accordingly, by detecting whether or not there is attenuation in the level of the received signals by the receiving elements 63, it is possible to detect the presence or absence of contact of an object and the contact position thereof.

Besides, in order to continuously detect the presence or absence of contact of an object and the contact position thereof and to improve the resolution of the detection position by increasing the time difference, the present inventor et al. proposed a touch panel device in which the excitation element and the receiving element are arranged so as to propagate surface acoustic waves in an oblique direction (diagonal direction) of the substrate. FIG. 2 is an illustration showing the configuration of such a touch panel device. In FIG. 2, the numeral 71 represents a rectangular non-piezoelectric substrate, and a center portion enclosed by the alternate long and short dash line is a detection region 71a capable of detecting the contact position.

In a frame region 71b outside the detection region 71a, which is a peripheral section of the non-piezoelectric substrate 71, excitation elements 72 are disposed on the upper side and lower side of the substrate 71, while receiving elements 73 are arranged on the left side and right side thereof. Each of the excitation elements 72 and the receiving elements 73 is constructed by forming a comb-like electrode 75 on a piezoelectric body 74 in the form of a thin film (shown by the alternate long and short dash line). The comb-like electrode 75 comprises facing bus electrodes 77, and a plurality of electrode fingers 78 which are extended from the bus electrodes 77 by turns and bent in the middle. In this configuration, lines of a plurality of electrode fingers 78 tilted in two directions from the facing direction of the bus electrodes 77 are formed, thereby realizing simultaneous excitation of surface acoustic waves in two directions and simultaneous reception of surface acoustic waves from two directions. Furthermore, in the frame region 71b, there are provided drawn-round wires 79 for connecting the respective bus electrodes 77 to external circuits.

In such a configuration, surface acoustic waves are excited in two directions by the excitation elements 72, and the excited surface acoustic waves are propagated in two diagonal directions of the non-piezoelectric substrate 71 and then received by the receiving elements 73. Based on the received results, the presence or absence of contact of an object and the contact position thereof are detected.

In addition, the present inventor et al. proposed a touch panel device in which each of the excitation elements and receiving elements is composed of a film-shape piezoelectric body, a comb-like electrode formed on one surface of the piezoelectric body, and a plate electrode (solid electrode) formed on the other surface of the piezoelectric body. FIG. 3 is an illustration showing the configuration of a touch panel device having such a SPT (Single Phased Transducer) electrode structure. In FIG. 3, the numeral 1 represents a rectangular non-piezoelectric substrate, and a center portion enclosed by the alternate long and short dash line is a detection region 1a capable of detecting the contact position.

In a frame region 1b outside the detection region 1a, which is a peripheral section of the non-piezoelectric substrate 1, excitation elements 2 for simultaneously exciting surface acoustic waves in two directions and receiving elements 3 for simultaneously receiving surface acoustic waves from two directions are arranged. Each of these excitation elements 2 and receiving elements 3 is constructed by forming a comb-like electrode 5 on one surface (front surface) of a piezoelectric body 4 in the form of a thin film (indicated by the alternate long and short dash line) and forming a plate electrode (solid electrode) 6 (indicated by the broken line) on the other surface (rear surface) thereof. The comb-like electrode 5 comprises one line of bus electrode 7, and a plurality of electrode fingers 8 which are extended from the bus electrode 7 and bent in V-shape in the middle. Additionally, drawn-round wires 9 from the respective plate electrodes 6 are placed in the frame region 1b.

In such a configuration, by applying a periodic signal between the comb-like electrode 5 and the plate electrode 6, surface acoustic waves are simultaneously excited in two directions by the excitation elements 2, and the excited surface acoustic waves are propagated in two diagonal directions of the non-piezoelectric substrate 1 and received by the receiving elements 3 (channels 1 through 4 in FIG. 3). Here, when an object such as a finger or a pen is in contact with the propagation path of a surface acoustic wave on the non-piezoelectric substrate 1, the surface acoustic wave attenuates. Therefore, by detecting the presence or absence of attenuation in the level of the received signals by the two receiving elements 3, it is possible to detect the presence or absence of contact of the object and the contact position thereof.

In a touch panel device using surface acoustic waves, it is desired that the excitation strength of surface acoustic wave should not vary greatly depending on the locations. The excitation elements and receiving elements of the touch panel devices using the comb-like electrodes shown in FIG. 2 and FIG. 3 have a structure in which an extremely large number of capacitors are continuously connected.

When an AC voltage signal is applied to the excitation element having such a structure, a delay is caused in the propagation of surface acoustic wave from the proximal end to the distal end of the signal input. Moreover, reflection of the signal occurs at the terminal end, and the reflected wave returns to the proximal end with delay. As a result, there is a difference in the voltage applied to the piezoelectric body between the proximal end and the distal end of the excitation element, thereby causing variations in the applied voltage as shown in FIG. 4. In FIG. 4, the voltage distribution is shown by indicating the distance from the signal input terminal on the abscissa and indicating the applied voltage on the ordinate. Note that the receiving element having the same structure as the excitation element also shows such an uneven voltage distribution.

Accordingly, the strength of the excited surface acoustic wave varies depending on the locations. Moreover, since the surface acoustic wave is propagated in a diagonal direction of the substrate, the propagation distance is not uniform, and therefore the amount of attenuation due to propagation changes according to the propagation distance. In the case where a change in the strength of surface acoustic wave due to variations in voltage and a change in the amount of attenuation according to the propagation distance are taken into account, the received signals in channels 1 through 4 in FIG. 3 have the outputs as shown in FIG. 5, and the change in the output of received signal differs in each channel. For example, the received signals in the region shown by hatching in FIG. 3 will be extremely low outputs. Thus, since the patterns of output strength of received signals in the respective channels are not the same, there is the problem that the contact position of the object cannot be detected accurately and there is a margin for improvement.

BRIEF SUMMARY OF THE INVENTION

The present invention has been made with the aim of solving the above problems, and it is an object of the present invention to provide a touch panel device capable of equalizing the voltage in an excitation element and in a receiving element when an AC voltage is applied to the excitation element and the receiving element.

Another object of the present invention is to provide a touch panel device capable of improving the detection accuracy of the contact position of an object by equalizing the voltage in the excitation element and in the receiving element.

A touch panel device according to a first aspect of the present invention is a touch panel device comprising an excitation element having a film-shape piezoelectric body and electrodes for exciting surface acoustic waves, and a receiving element having a film-shape piezoelectric body and electrodes for receiving surface acoustic waves, in a peripheral section of a rectangular substrate to propagate surface acoustic waves from the excitation element to the receiving element and detect a position of an object in contact with the substrate, based on received results by the receiving element, and comprises terminal resistances provided at terminal end portions of the electrodes of the excitation element and the receiving element, wherein voltage distributions in the excitation element and in the receiving element when an AC voltage is applied to the electrodes of the excitation element and the receiving element are controlled by the terminal resistances.

In the touch panel of the first aspect, by preventing reflection of the AC voltage signal with the terminal resistances provided at the terminal end portions of the electrodes of the excitation element and the receiving element, the voltage distributions in the excitation element and in the receiving element when the AC voltage is applied to the electrodes of the excitation element and the receiving element are controlled to have equal voltage from the proximal end to the distal end of the AC voltage signal input. Accordingly, the received signals in a plurality of channels have the same output pattern, and the contact position of the object can be accurately detected.

According to a touch panel device of a second aspect of the present invention, in the first aspect, the terminal resistance is integrally formed with the electrode. In the touch panel device of the second aspect, the terminal resistances are formed by using the electrodes of the excitation element and the receiving element. Hence, the terminal resistances can be easily formed.

A touch panel device of a third aspect of the present invention is a touch panel device comprising an excitation element having a film-shape piezoelectric body and electrodes for exciting surface acoustic waves, and a receiving element having a film-shape piezoelectric body and electrodes for receiving surface acoustic waves, in a peripheral section of a rectangular substrate to propagate surface acoustic waves from the excitation element to the receiving element and detect a position of an object in contact with the substrate, based on received results by the receiving element, wherein voltage distributions in the excitation element and in the receiving element when an AC voltage is applied to the electrodes of the excitation element and the receiving element are controlled by adjusting a resistance value of the electrodes of the excitation element and the receiving element.

In the touch panel of the third aspect, by adjusting the resistance value of the excitation element and the receiving element, the voltage distributions in the excitation element and in the receiving element when the AC voltage is applied to the electrodes of the excitation element and the receiving element are controlled to have equal voltage from the proximal end to the distal end of the AC voltage signal input. Accordingly, the received signals in a plurality of channels have the same output pattern, and the contact position of the object can be accurately detected.

According to a touch panel device of a fourth aspect of the present invention, in the third aspect, the resistance value is adjusted stepwise or continuously. In the touch panel device of the fourth aspect, by adjusting the resistance value of the electrodes stepwise or continuously, the voltage distributions in the excitation element and in the receiving element are controlled to have equal voltage distributions.

A touch panel device of a fifth aspect of the present invention is a touch panel device comprising an excitation element having a film-shape piezoelectric body and electrodes for exciting surface acoustic waves, and a receiving element having a film-shape piezoelectric body and electrodes for receiving surface acoustic waves, in a peripheral section of a rectangular substrate to propagate surface acoustic waves from the excitation element to the receiving element and detect a position of an object in contact with the substrate, based on received results by the receiving element, wherein voltage distributions in the excitation element and in the receiving element when an AC voltage is applied to the electrodes of the excitation element and the receiving element are controlled by adjusting a capacitance value of the excitation element and the receiving element.

In the touch panel of the fifth aspect, by adjusting the capacitance value of the excitation element and the receiving element, the voltage distributions in the excitation element and in the receiving element when the AC voltage is applied to the electrodes of the excitation element and the receiving element are controlled to have equal voltage from the proximal end to the distal end of the AC voltage signal input. Accordingly, the received signals in a plurality of channels have the same output pattern, and the contact position of the object can be accurately detected.

According to a touch panel device of a sixth aspect, in the fifth aspect, the capacitance value is adjusted stepwise or continuously. In the touch panel device of the sixth aspect, by adjusting the capacitance value of the excitation element and the receiving element stepwise or continuously, the voltage distributions in the excitation element and in the receiving element are controlled to have equal voltage distributions.

According to a touch panel device of a seventh aspect, in any one of the first through sixth aspects, the excitation element and the receiving element have, as the electrodes, a comb-like electrode formed on one surface of the piezoelectric body, and a plate electrode formed on other surface of the piezoelectric body. In the touch panel of the seventh aspect, each of the excitation element and the receiving element is constructed by forming a comb-like electrode with a plurality of extended electrode fingers having the same polarity on one surface of a piezoelectric body and forming a plate electrode having a different polarity from the comb-like electrode on other surface of the piezoelectric body. It is therefore possible to narrow the frame region, increase the degree of freedom in designing the electrodes, and easily control the voltage distributions in the excitation element and in the receiving element.

According to a touch panel device of an eighth aspect, in any one of the first through seventh aspects, a pair of the excitation element and receiving element are arranged in the peripheral section in a diagonal direction of the substrate so as to propagate surface acoustic waves in the diagonal direction on the substrate. In the touch panel device of the eighth aspect, since the surface acoustic waves are propagated in a diagonal direction of the substrate, the propagation loss of the surface acoustic waves is not constant. Therefore, the propagation loss which is not constant is compensated by control of the voltage distributions in the excitation element and in the receiving element.

The above and further objects and features of the invention will more fully be apparent from the following detailed description with accompanying drawings.

DETAILED DESCRIPTION OF THE INVENTION

The following description will explain the present invention in detail with reference to the drawings illustrating some embodiments thereof.

Figure 6:
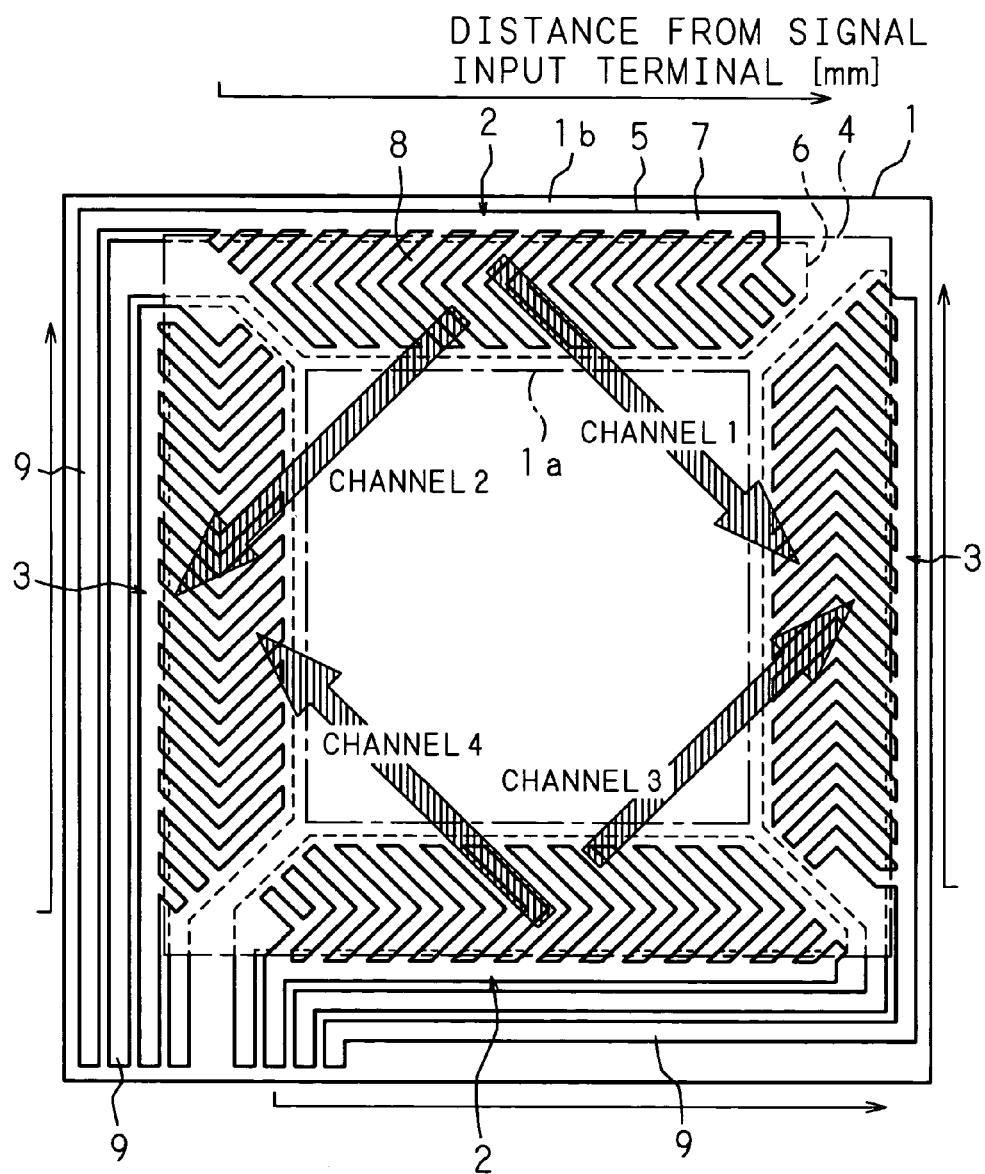
FIG. 6 is an illustration showing the configuration of a touch panel device according to the present invention.

FIG. 6 is an illustration showing the configuration of a touch panel device according to the present invention. In FIG. 6, the numeral 1 represents a rectangular non-piezoelectric substrate which is made, for example, of a glass material and capable of propagating surface acoustic waves, and a center portion enclosed by an alternate long and short dash line is a detection region 1a capable of detecting a contact position. In a frame region 1b outside the detection region 1a, which is a peripheral section of the non-piezoelectric substrate 1, excitation elements 2 for simultaneously exciting surface acoustic waves in two directions are placed on the upper side and lower side of the frame region 1b, and receiving elements 3 for simultaneously receiving surface acoustic waves from two directions are placed on the left side and the right side thereof.

Figure 7:
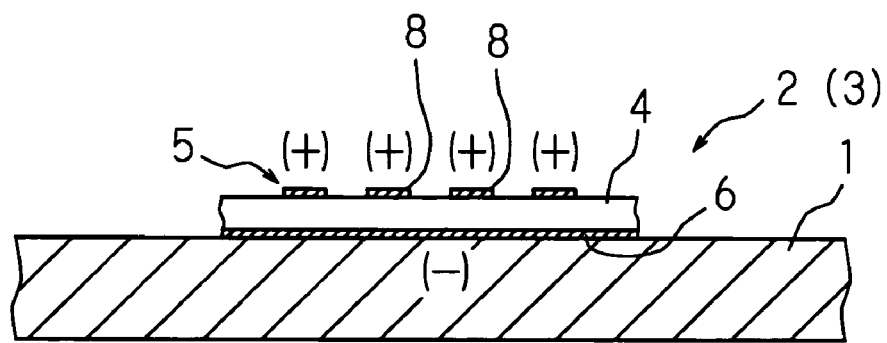
FIG. 7 is a partial cross section of the excitation element or the receiving element of the touch panel device shown in FIG. 6.

These excitation elements 2 and receiving elements 3 have the same structure. FIG. 7 is a partial cross section of the excitation element 2 or the receiving element 3. The excitation element 2, or the receiving element 3, is constructed by forming a comb-like electrode 5 on one surface (front surface) of a piezoelectric body 4 in the form of a thin film made of AlN or ZnO, for example, and forming a plate electrode (solid electrode) 6 on the other surface (rear surface) thereof. As shown in FIG. 6, the comb-like electrode 5 on the front surface comprises one line of bus electrode 7, and a plurality of electrode fingers 8 which are extended from the bus electrode 7 and bent in V-shape in the middle. Note that, in FIG. 6, the plate electrode 6 is indicated by the broken line, and the installation range of the piezoelectric body 4 is indicated by the alternate long and short dash line.

These comb-like electrodes 5 and plate electrodes 6 are connected to external circuits (such as an oscillation circuit and a received level detection circuit), and flexible cables are often used for the connection. Accordingly, as shown in FIG. 6, drawn-round wires 9 from the respective comb-like electrodes 5 (bus electrodes 7) and the respective plate electrodes 6 are placed in the frame region 1b so that they are connected to the flexible cables at one position of the touch panel device.

In such a configuration, by applying an AC voltage signal between the comb-like electrode 5 and the plate electrode 6, surface acoustic waves are excited in two directions simultaneously by the excitation element 2, and the excited surface acoustic waves are propagated in two diagonal directions of the non-piezoelectric substrate 1 and received by the receiving elements 3. More specifically, the surface acoustic waves from the upper-side excitation element 2 are propagated in a lower right oblique direction (channel 1) and a lower left oblique direction (channel 2) and then received by the right-side and left-side receiving elements 3, while the surface acoustic waves from the lower-side excitation element 2 are propagated in an upper right oblique direction (channel 3) and an upper left oblique direction (channel 4) and then received by the right-side and left-side receiving elements 3.

Here, if an object such as a finger or a pen is in contact with the propagation path of a surface acoustic wave on the non-piezoelectric substrate 1, the surface acoustic wave attenuates. Therefore, by detecting the presence or absence of attenuation in the level of the received signals by the two receiving elements 3, it is possible to detect the presence or absence of contact of the object and the contact position thereof.

In the present invention, each of the excitation elements 2 and the receiving elements 3 is constructed by forming the comb-like electrode 5 with a plurality of extended electrode fingers 8 of the same polarity on the front surface of the piezoelectric body 4 and forming the plate electrode 6 having a different polarity from the electrode fingers 8 on the rear surface of the piezoelectric body 4 (see FIG. 7). Thus, only the width of one line of bus electrode 7 is necessary, and the frame region 1b can be narrowed compared to an example of the structure shown in FIG. 2 in which each side needs the width of two lines of bus electrodes 77 because the electrodes of different polarities are present on the same plane. Moreover, since there is no need to dispose electrodes of different polarities on the same plane, it is possible to increase the degree of freedom in designing the electrodes, drawn-round wires, etc.

Figure 8:
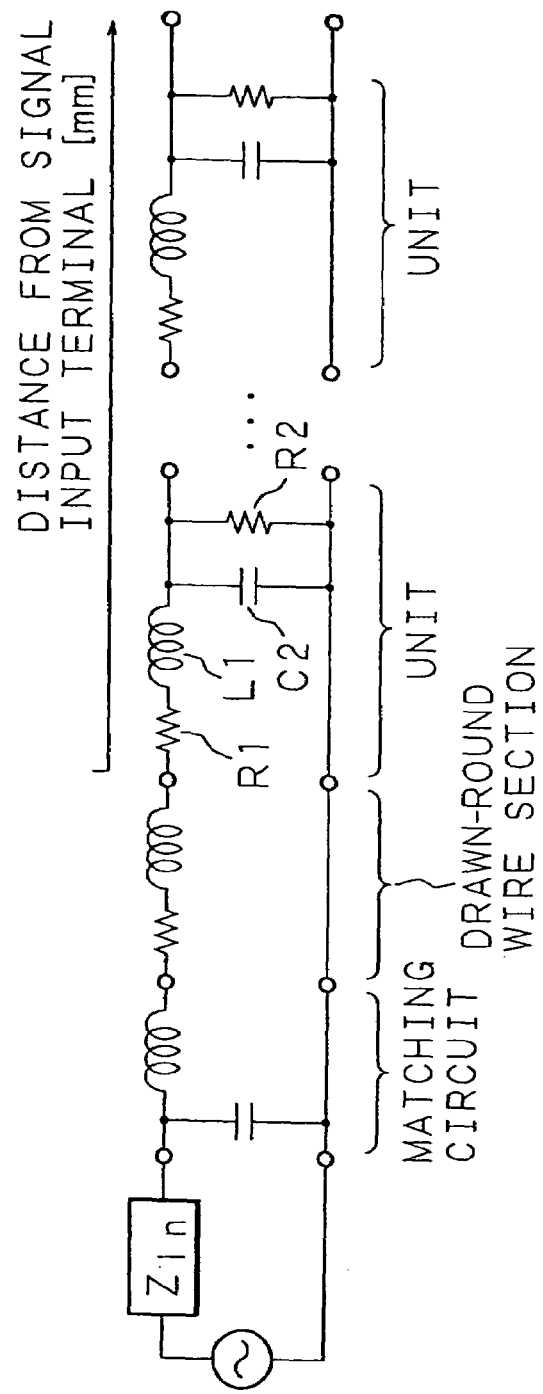
FIG. 8 is an illustration showing an equivalent circuit of the touch panel device shown in FIG. 6.

FIG. 8 is an illustration showing an equivalent circuit of the touch panel device shown in FIG. 6. In the present invention described below, calculation of the distribution of voltage applied to the piezoelectric body 4 and setting of adjustment values of various parameters are based on simulation results from the equivalent circuit shown in FIG. 8. This equivalent circuit is composed of a matching circuit section that is not shown in FIG. 6, the section of drawn-round wires 9, and a plurality of units.

In the region of the excitation element 2 or the receiving element 3 where surface acoustic waves are transmitted or received, an extremely large number of capacitors are continuously present. By approximating this region as continuous presence of a plurality of units, it is possible to approximate the operation of a distributed constant circuit. In other words, it is possible to obtain a voltage distribution reflecting an applied voltage signal and the influence of propagation delay of the signal reflected at the terminal end. In this example, the respective units are obtained by dividing the excitation region with a length of 60 mm into 1000 equal parts. In each unit, R1 corresponds to the resistance value of the bus electrode 7 and the plate electrode 6, L1 corresponds to the inductance of the comb-like electrode 5 and the plate electrode 6, C2 corresponds to the capacitance between the comb-like electrode 5 and the plate electrode 6, and R2 corresponds to the resistance of the electrode finger 8. When special adjustments are not made, the values are R1=7.5 mΩ, L1=71.4 nH, C2=0.96 pF, and R2=72 kΩ.

The following description will explain specific embodiments of the present invention in which, when an AC voltage is applied to the excitation element 2 and the receiving element 3, the voltage distributions are controlled to have equal voltage in the excitation element 2 and in the receiving element 3.

FIRST EMBODIMENT

Figure 9:
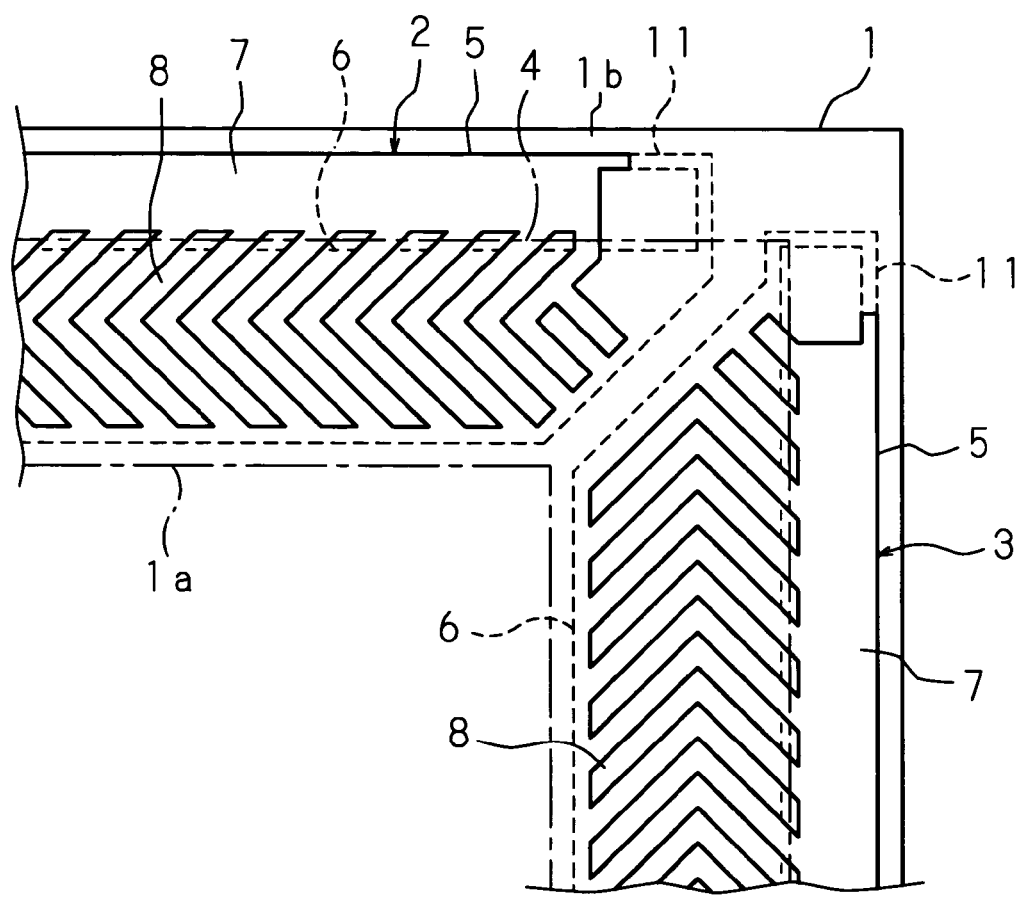
FIG. 9 is an illustration showing a part of the configuration of a touch panel device in the first embodiment.

FIG. 9 is an illustration showing a part of the configuration of the touch panel device in the first embodiment of the present invention. In FIG. 9, the same parts as in FIG. 6 are designated with the same numerals, and an explanation thereof is omitted. In the first embodiment, a terminal resistance 11 is formed at the distal end of the signal input of the plate electrode 6 of each of the excitation element 2 and the receiving element 3 so as to control the voltage distributions in the excitation element 2 and in the receiving element 3.

Figure 10:
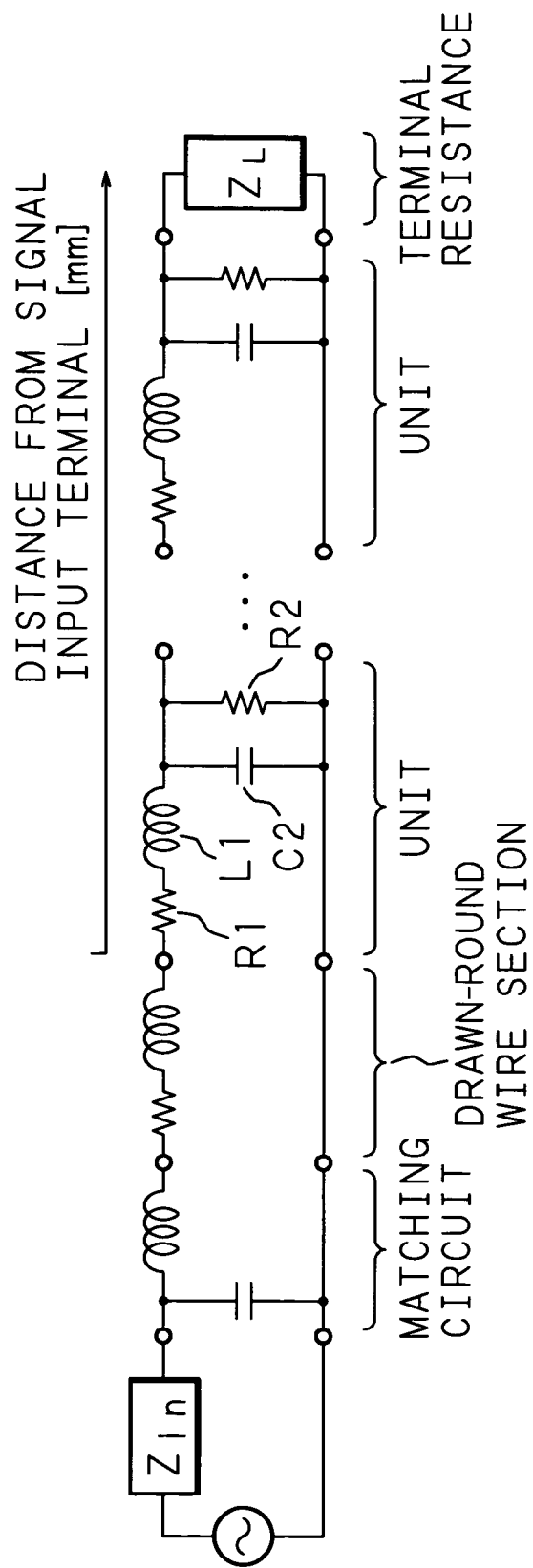
FIG. 10 is an illustration showing an equivalent circuit of the touch panel device shown in FIG. 9.

More specifically, the terminal resistance 11 of 23 Ω is formed by providing an Al pattern with a width of 10 μm, a length of 3.7 mm and a thickness of 0.6 μm at the distal end of the plate electrode 6, and the upper-side comb-like electrode 5 and the lower-side plate electrode 6 are connected through the terminal resistance 11. The terminal resistance 11 prevents reflection of the AC voltage signal at the terminal end. By forming the upper-side comb-like electrode 5 with a technique such as lift-off or printing, the upper-side and lower-side electrodes 5 and 6 are relatively easily connected through the terminal resistance 11. The equivalent circuit in the first embodiment is shown in FIG. 10. The parameters of this equivalent circuit are R1=7.5 mΩ, L1=71.4 nH, C2=0.96 pF, and R2=72 kΩ.

Figure 11:
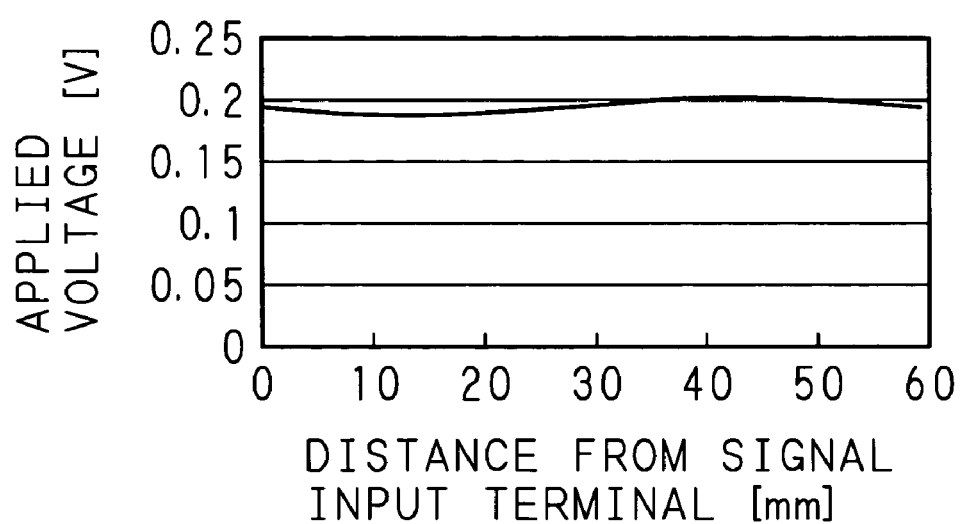
FIG. 11 is a graph showing the voltage distribution in an excitation element and a receiving element in the first embodiment.
Figure 12:
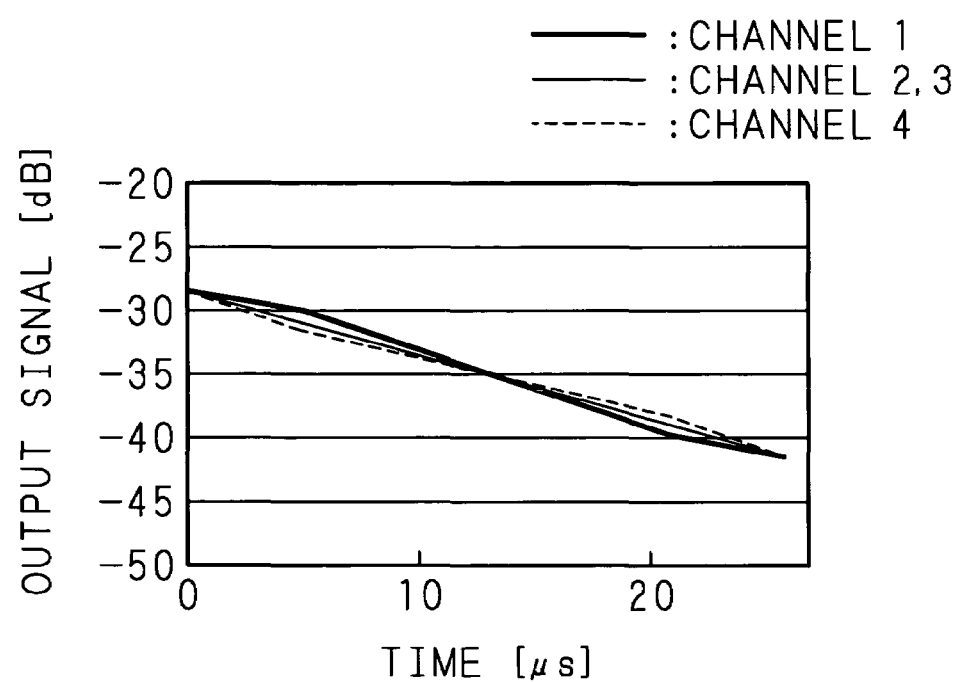
FIG. 12 is a graph showing the output signals of the receiving elements of the respective channels in the first embodiment.

FIG. 11 is a graph showing the voltage distribution in the excitation element 2 and the receiving element 3 in the first embodiment, in which substantially equal voltage is realized from the proximal end to the distal end of the AC voltage signal input. Further, FIG. 12 is a graph showing the output signals of the receiving elements 3 of the respective channels in the first embodiment in which propagation loss is taken into account, and the output signals of the receiving elements 3 of the respective channels have the same pattern. This is due to the equal voltage distribution in the excitation element 2 and the receiving element 3 obtained by the provision of the terminal resistance 11.

Note that, in the example shown in FIG. 9, although the terminal resistance 11 is integrally formed with the plate electrode 6, a terminal resistance for preventing reflection at the terminal end of the AC voltage signal may be formed integrally with the upper-side comb-like electrode 5.

SECOND EMBODIMENT

Figure 13:
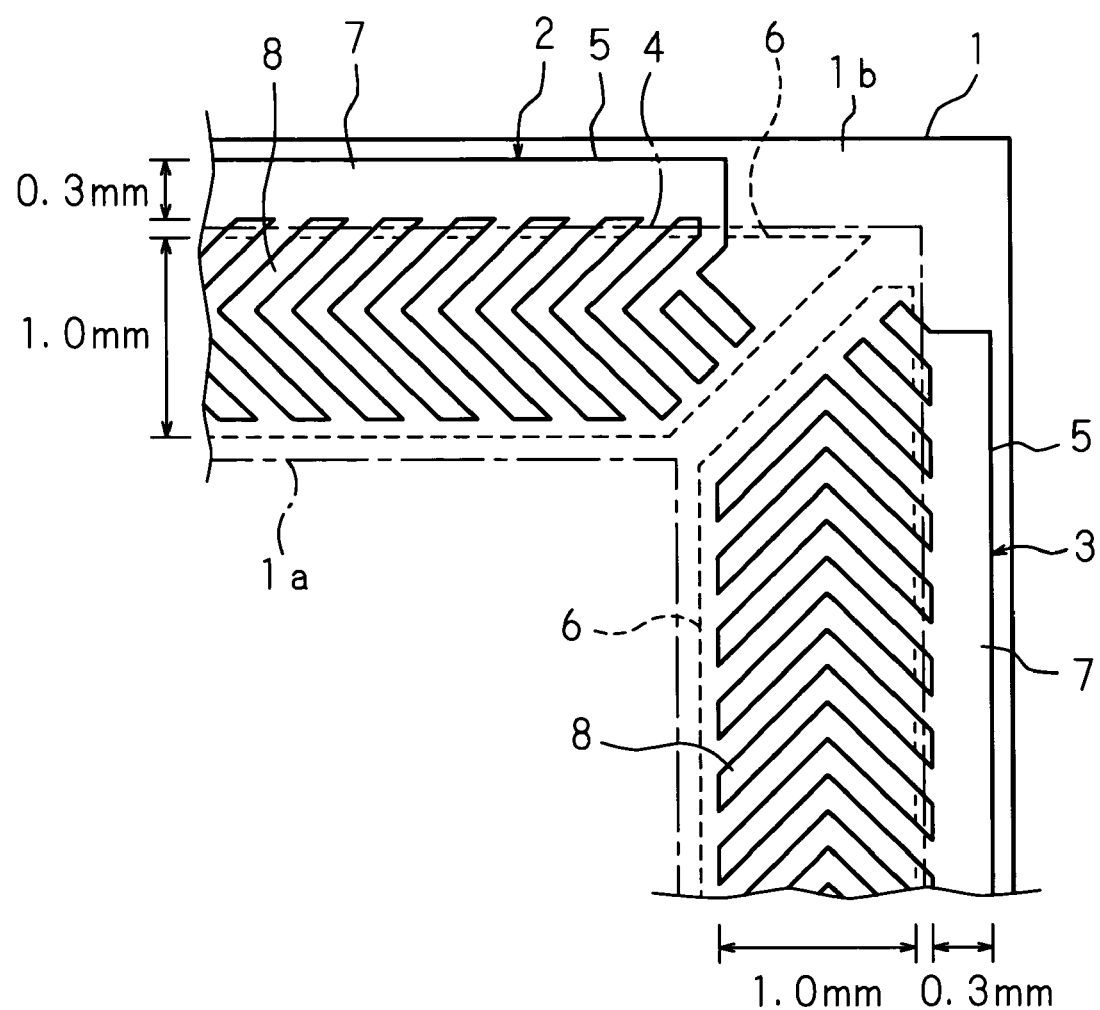
FIG. 13 is an illustration showing a part of the configuration of a touch panel device in the second embodiment.

FIG. 13 is an illustration showing a part of the configuration of a touch panel device in the second embodiment of the present invention. In FIG. 13, the same parts as in FIG. 6 are designated with the same numerals, and an explanation thereof is omitted. In the second embodiment, the voltage distributions in the excitation element 2 and in the receiving element 3 are controlled by adjusting the width and/or the thickness of the bus electrode 7 and of the plate electrode 6 of the excitation element 2 and the receiving element 3.

More specifically, the line resistance of the bus electrode 7 is adjusted to 0.63 Ω/cm, and the line resistance of the plate electrode 6 is adjusted to 2.10 Ω/cm. In this case, the resistance R1 of each unit in the equivalent circuit shown in FIG. 8 is 16.1 mΩ, and other parameters are L1=71.4 nH, C2=0.96 pF, and R2=72 kΩ.

Figure 14:
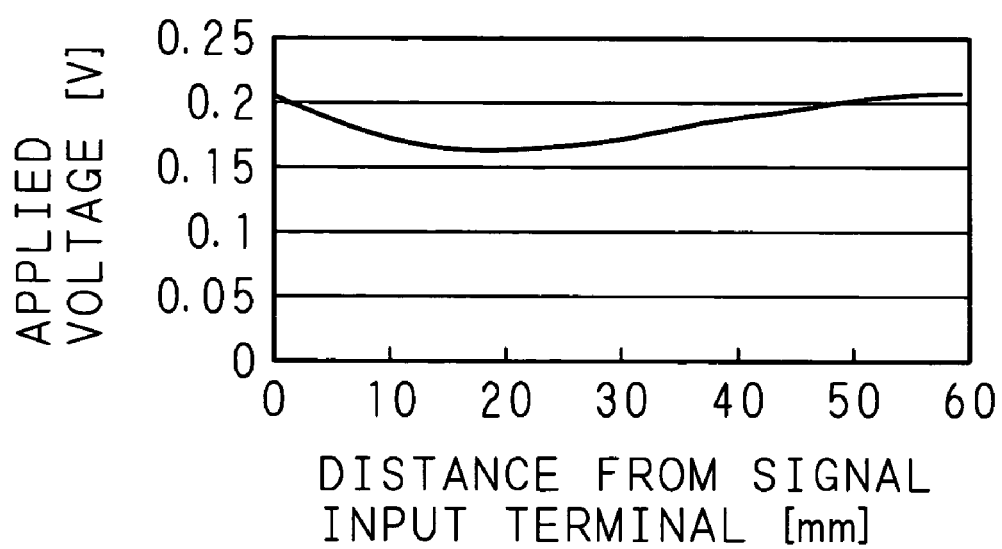
FIG. 14 is a graph showing the voltage distribution in an excitation element and a receiving element in the second embodiment.
Figure 15:
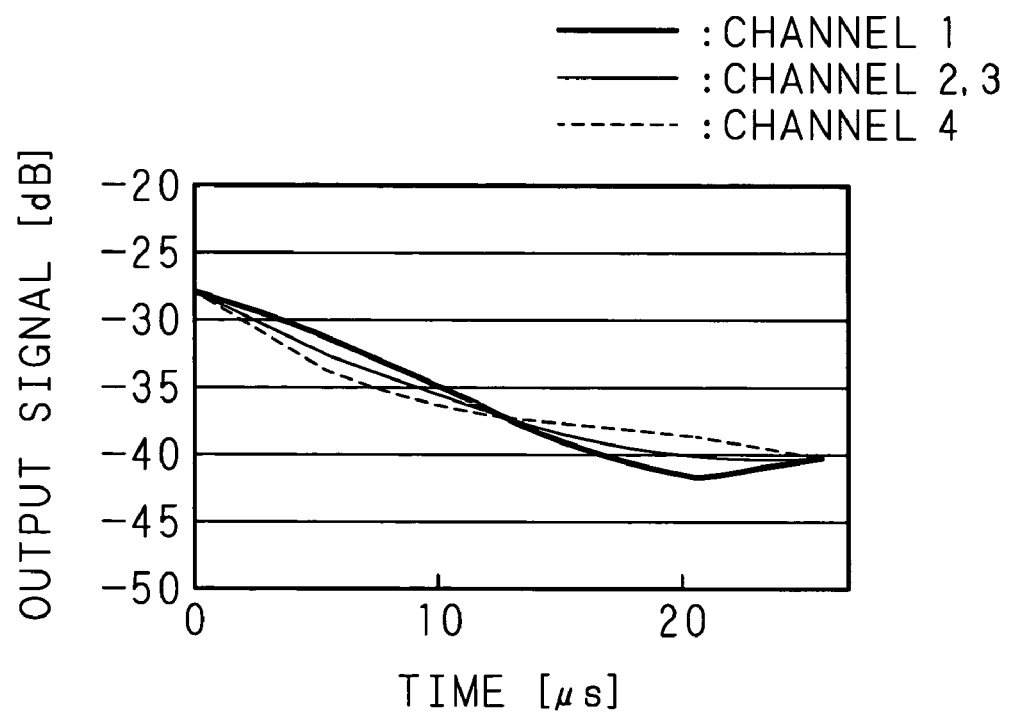
FIG. 15 is a graph showing the output signals of the receiving elements of the respective channels in the second embodiment.

FIG. 14 is a graph showing the voltage distribution in the excitation element 2 and the receiving element 3 in the second embodiment, in which substantially equal voltage is realized from the proximal end to the distal end of the AC voltage signal input. Further, FIG. 15 is a graph showing the output signals of the receiving elements 3 of the respective channels in the second embodiment in which propagation loss is taken into account, and the output signals of the receiving elements 3 of the respective channels have the same pattern. This is due to the equal voltage distribution in the excitation element 2 and the receiving element 3 obtained by adjusting the resistance value of the bus electrode 7 and that of the plate electrode 6.

Note that, in the above-described example, although the width and/or the thickness of the bus electrode 7 and of the plate electrode 6 are adjusted, it may be possible to adjust either the bus electrode 7 or the plate electrode 6.

THIRD EMBODIMENT

Figure 16:
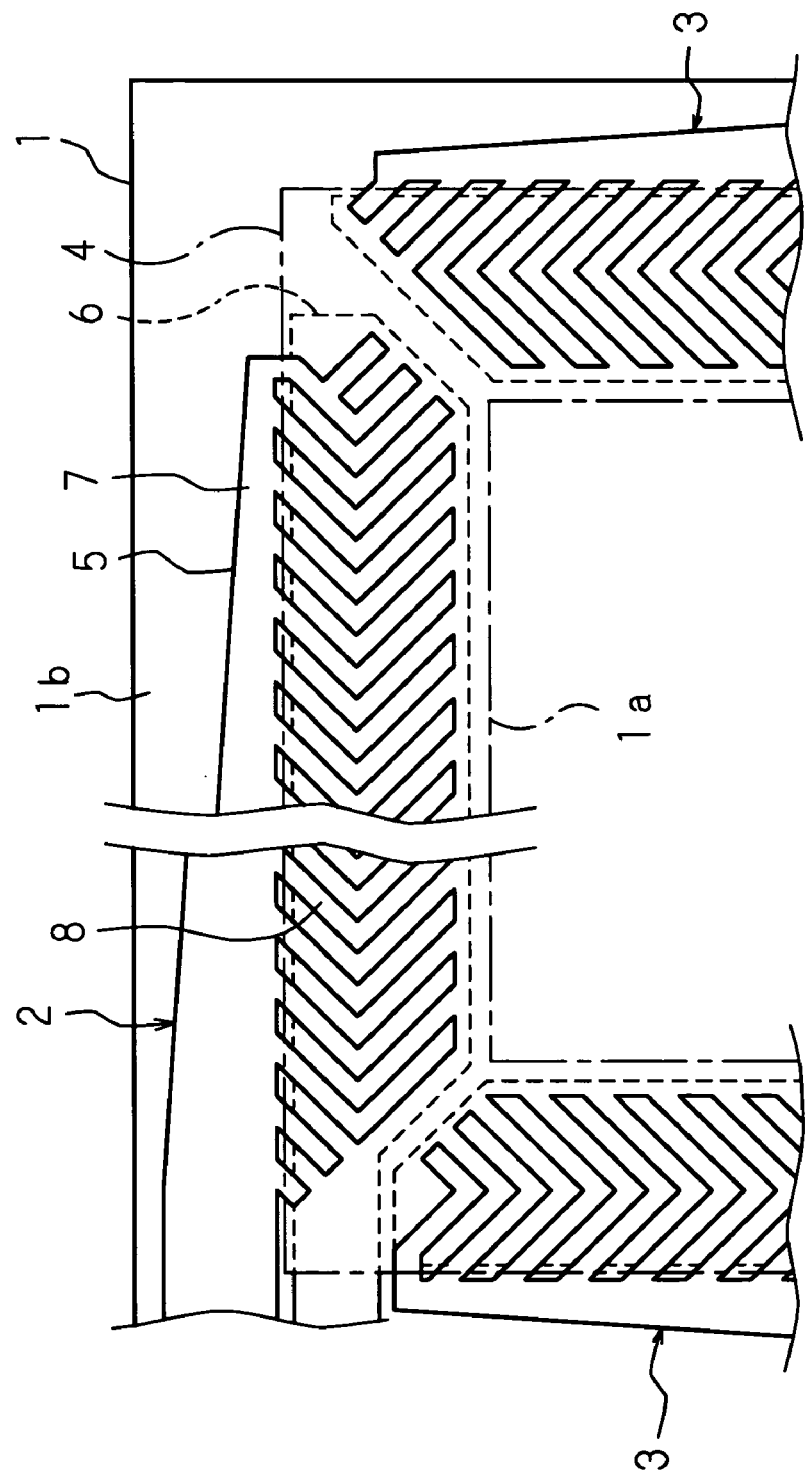
FIG. 16 is an illustration showing a part of the configuration of a touch panel device in the third embodiment.

FIG. 16 is an illustration showing a part of the configuration of a touch panel device in the third embodiment of the present invention. In FIG. 16, the same parts as in FIG. 6 are designated with the same numerals, and an explanation thereof is omitted. In the third embodiment, the voltage distributions in the excitation element 2 and in the receiving element 3 are controlled by continuously changing the width of the bus electrode 7 of the excitation element 2 and that of the receiving element 3.

More specifically, the width of the bus electrode 7 is gradually decreased from the proximal end to the distal end of the AC voltage signal input. In this case, in the equivalent circuit shown in FIG. 8, the value of resistance R1 differs in each unit, and R1=9.7 mΩ at the proximal end and R1=96.9 mΩ at the distal end. Other parameters are L1=71.4 nH, C2=0.96 pF, and R2=72 kΩ in all units.

Figure 17:
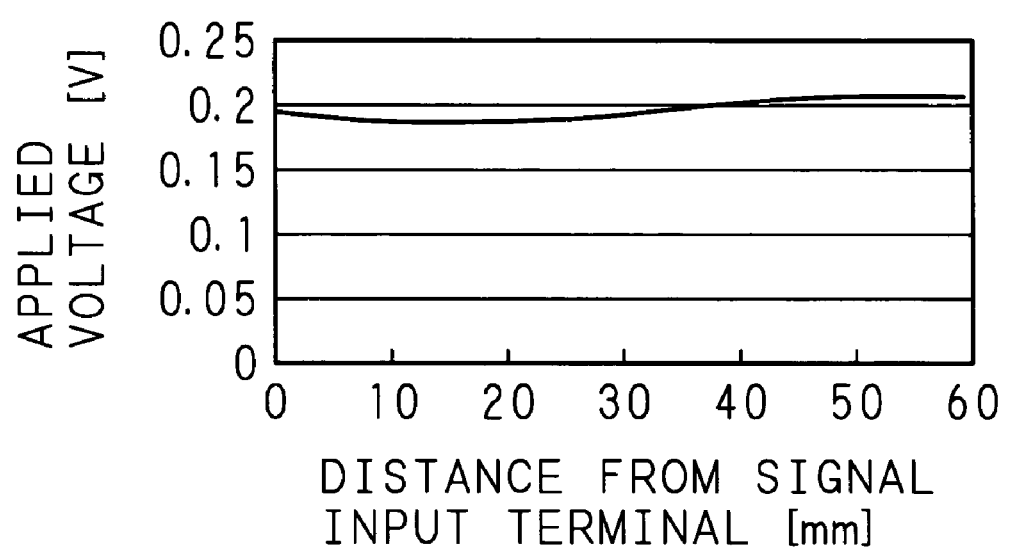
FIG. 17 is a graph showing the voltage distribution in an excitation element and a receiving element in the third embodiment.
Figure 18:
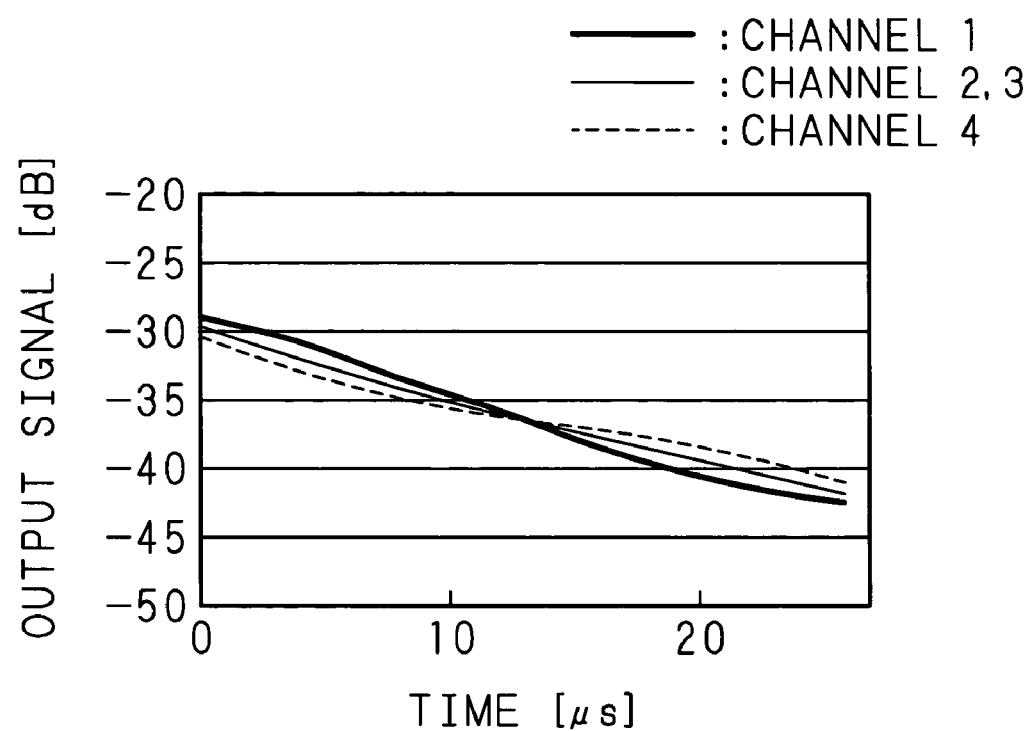
FIG. 18 is a graph showing the output signals of the receiving elements of the respective channels in the third embodiment.

FIG. 17 is a graph showing the voltage distribution in the excitation element 2 and the receiving element 3 in the third embodiment, in which substantially equal voltage is realized from the proximal end to the distal end of the AC voltage signal input. Further, FIG. 18 is a graph showing the output signals of the receiving elements 3 of the respective channels in the third embodiment in which propagation loss is taken into account, and the output signals of the receiving elements 3 of the respective channels have the same pattern. This is due to the equal voltage distribution in the excitation element 2 and the receiving element 3 obtained by adjusting the width (the resistance value) of the bus electrode 7.

Note that, in the above-described example, although the resistance value of the bus electrode 7 is continuously changed, it may be possible to continuously change the resistance value of the plate electrode 6.

FOURTH EMBODIMENT

Figure 19:
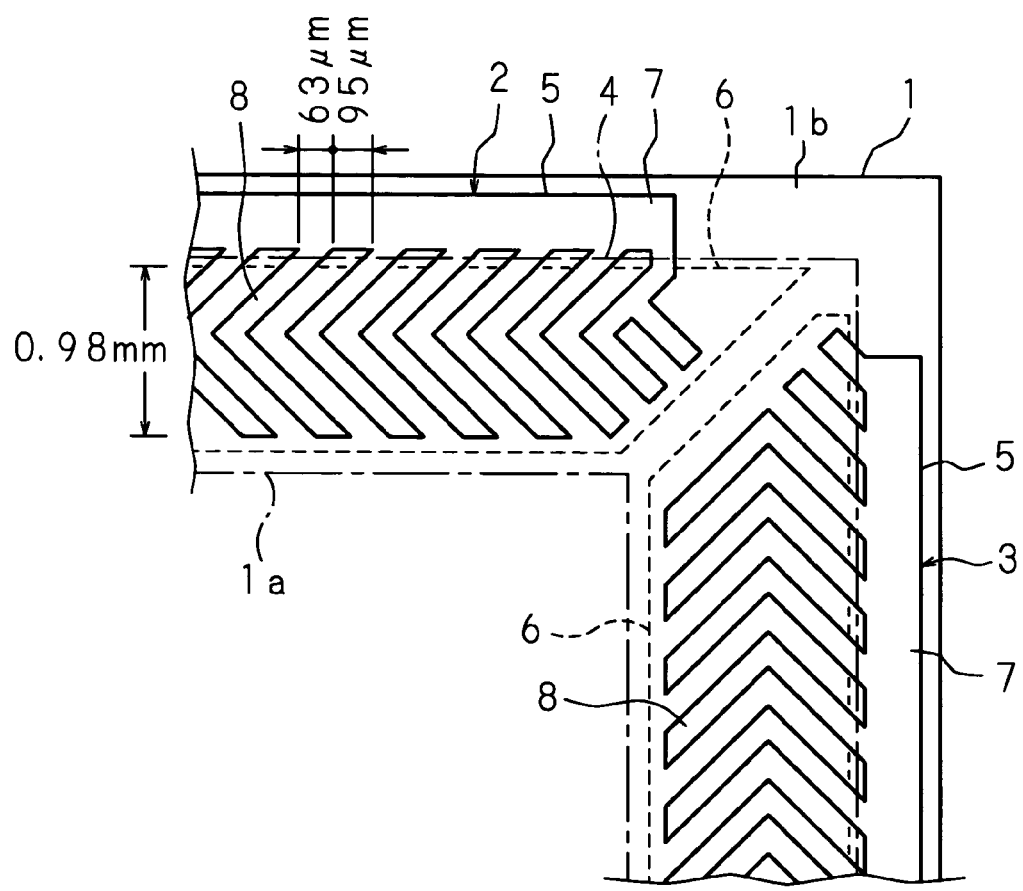
FIG. 19 is an illustration showing a part of the configuration of a touch panel device in the fourth embodiment.

FIG. 19 is an illustration showing a part of the configuration of a touch panel device in the fourth embodiment of the present invention. In FIG. 19, the same parts as in FIG. 6 are designated with the same numerals and an explanation thereof is omitted. In the fourth embodiment, the voltage distributions in the excitation element 2 and in the receiving element 3 are controlled by adjusting the value of capacitance created between the electrode finger 8 and the plate electrode 6 of the excitation element 2 and that of the receiving element 3.

More specifically, the capacitance C2 of each unit in the equivalent circuit shown in FIG. 8 is adjusted to 0.482 pF, and other parameters are R1=21 mΩ, L1=71.4 nH, and R2=72 kΩ.

Figure 20:
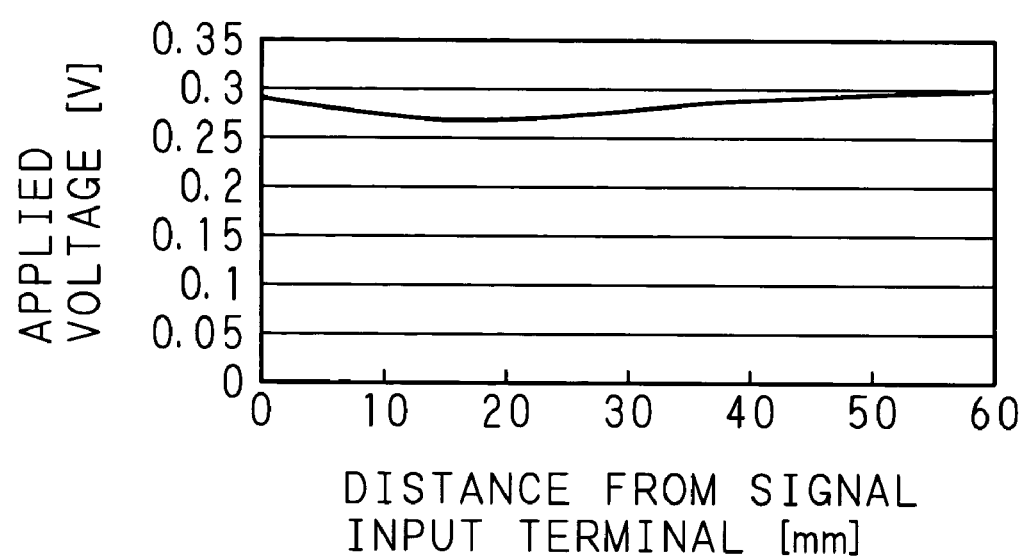
FIG. 20 is a graph showing the voltage distribution in an excitation element and a receiving element in the fourth embodiment.

FIG. 20 is a graph showing the voltage distribution in the excitation element 2 and the receiving element 3 in the fourth embodiment, in which substantially equal voltage is realized from the proximal end to the distal end of the AC voltage signal input by the adjustment of the capacitance value between the electrode finger 8 and the plate electrode 6.

Note that, in the above-described example, the area (width or length) of each electrode finger 8 or the thickness of the piezoelectric body 4 may be adjusted to adjust the capacitance value between the electrode finger 8 and the plate electrode 6.

FIFTH EMBODIMENT

Figure 21:
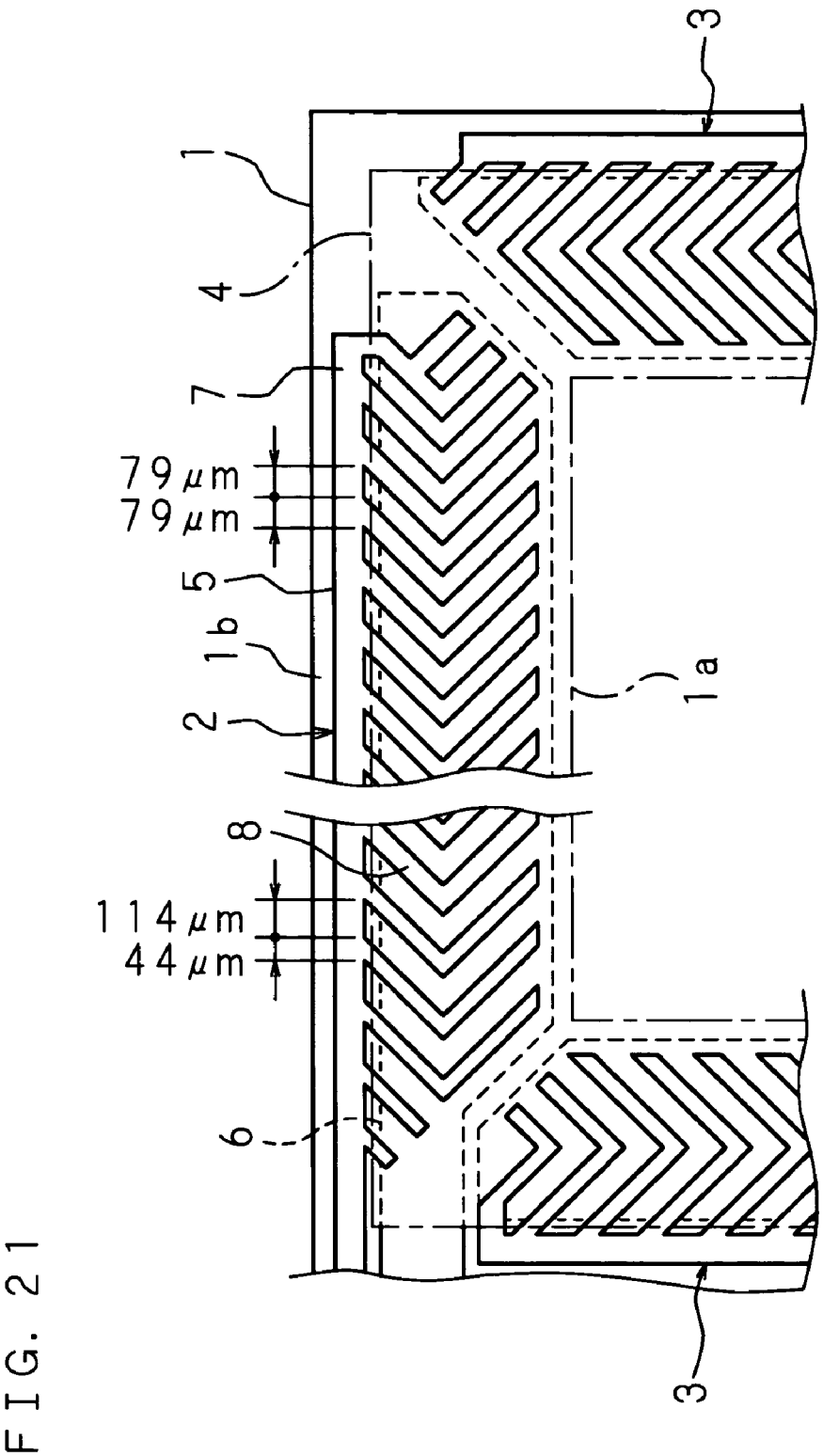
FIG. 21 is an illustration showing a part of the configuration of a touch panel device in the fifth embodiment.

FIG. 21 is an illustration showing a part of the configuration of a touch panel device in the fifth embodiment of the present invention. In FIG. 21, the same parts as in FIG. 6 are designated with the same numerals, and an explanation thereof is omitted. In the fifth embodiment, the voltage distributions in the excitation element 2 and in the receiving element 3 are controlled by successively changing the widths of the electrode fingers 8 of the excitation element 2 and those of the receiving element 3.

More specifically, the widths of the electrode fingers 8 are gradually increased from the proximal end to the distal end of the AC voltage signal input. However in order to maintain a resonance condition, the formation pitch between adjacent electrode fingers 8 is fixed (158 μm). In this case, in the equivalent circuit shown in FIG. 8, the value of the capacitance C2 differs in each unit, and C2=0.53 pF at the proximal end and C2=0.96 pF at the distal end. Other parameters are R1=9.7 mΩ, L1=71.4 nH, and R2=72 kΩ in all units.

Figure 22:
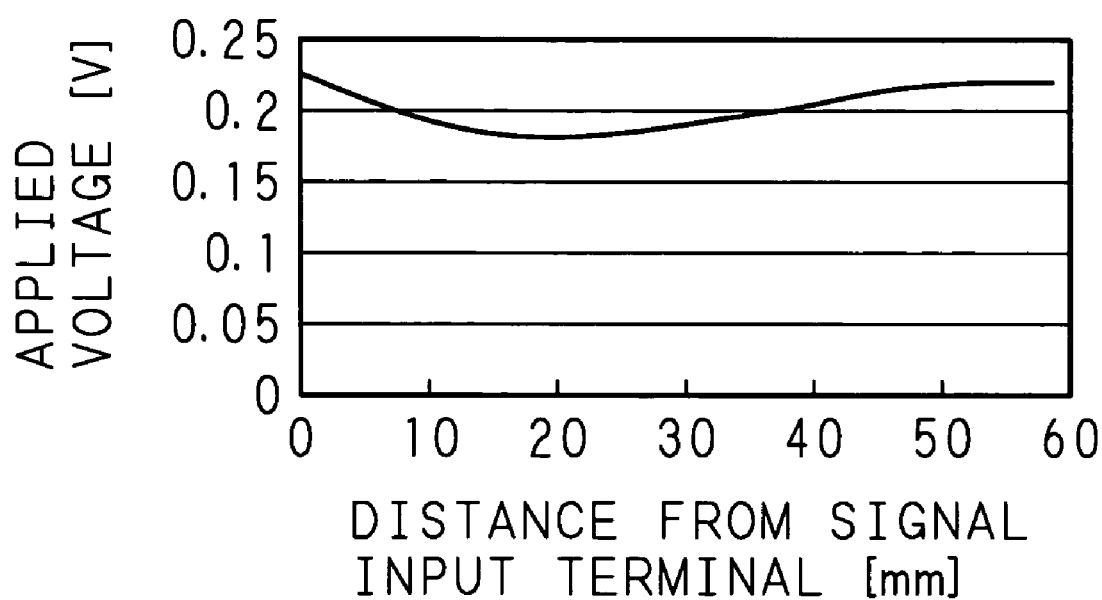
FIG. 22 is a graph showing the voltage distribution in an excitation element and a receiving element in the fifth embodiment.

FIG. 22 is a graph showing the voltage distribution in the excitation element 2 and the receiving element 3 in the fifth embodiment, in which substantially equal voltage is realized from the proximal end to the distal end of the AC voltage signal input by the adjustment of the capacitance value between the electrode finger 8 and the plate electrode 6.

Note that, in the above-described example, although the widths of the electrode fingers 8 are successively changed, it may be possible to successively change the lengths of the electrode fingers 8.

SIXTH EMBODIMENT

Figure 23:
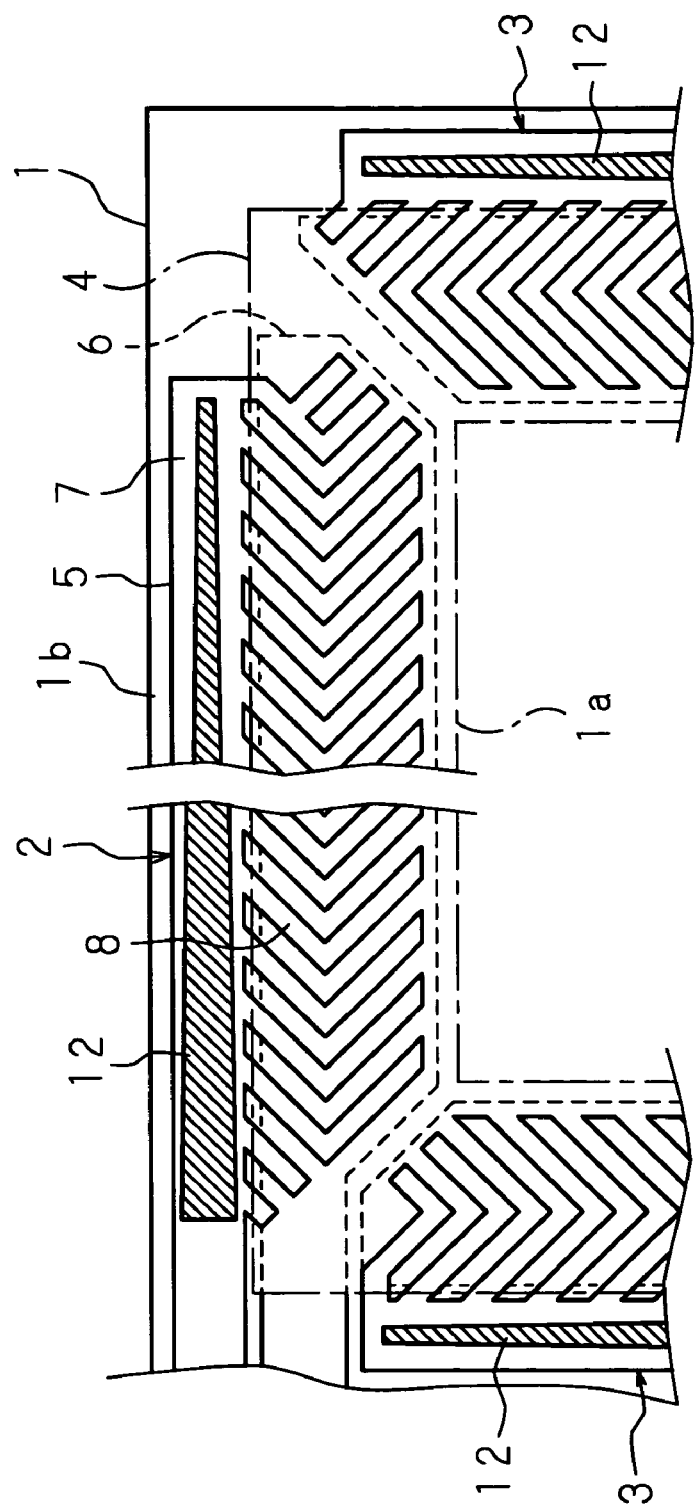
FIG. 23 is an illustration showing a part of the configuration of a touch panel device in the sixth embodiment.

FIG. 23 is an illustration showing a part of the configuration of a touch panel device in the sixth embodiment of the present invention. In FIG. 23, the same parts as in FIG. 6 are designated with the same numerals, and an explanation thereof is omitted. In the sixth embodiment, the voltage distributions in the excitation element 2 and in the receiving element 3 are controlled by adjusting the inductance (the value of L1 in the equivalent circuit in FIG. 8) of the bus electrode 7 of the excitation element 2 and that of the receiving element 3.

More specifically, a dielectric 12 is formed on the bus electrode 7, and the width of the dielectric 12 is gradually decreased from the proximal end to the distal end of the AC voltage signal input. Note that it may be possible to continuously change the thickness of the dielectric 12, instead of changing the width of the dielectric 12.

SEVENTH EMBODIMENT

Figure 24:
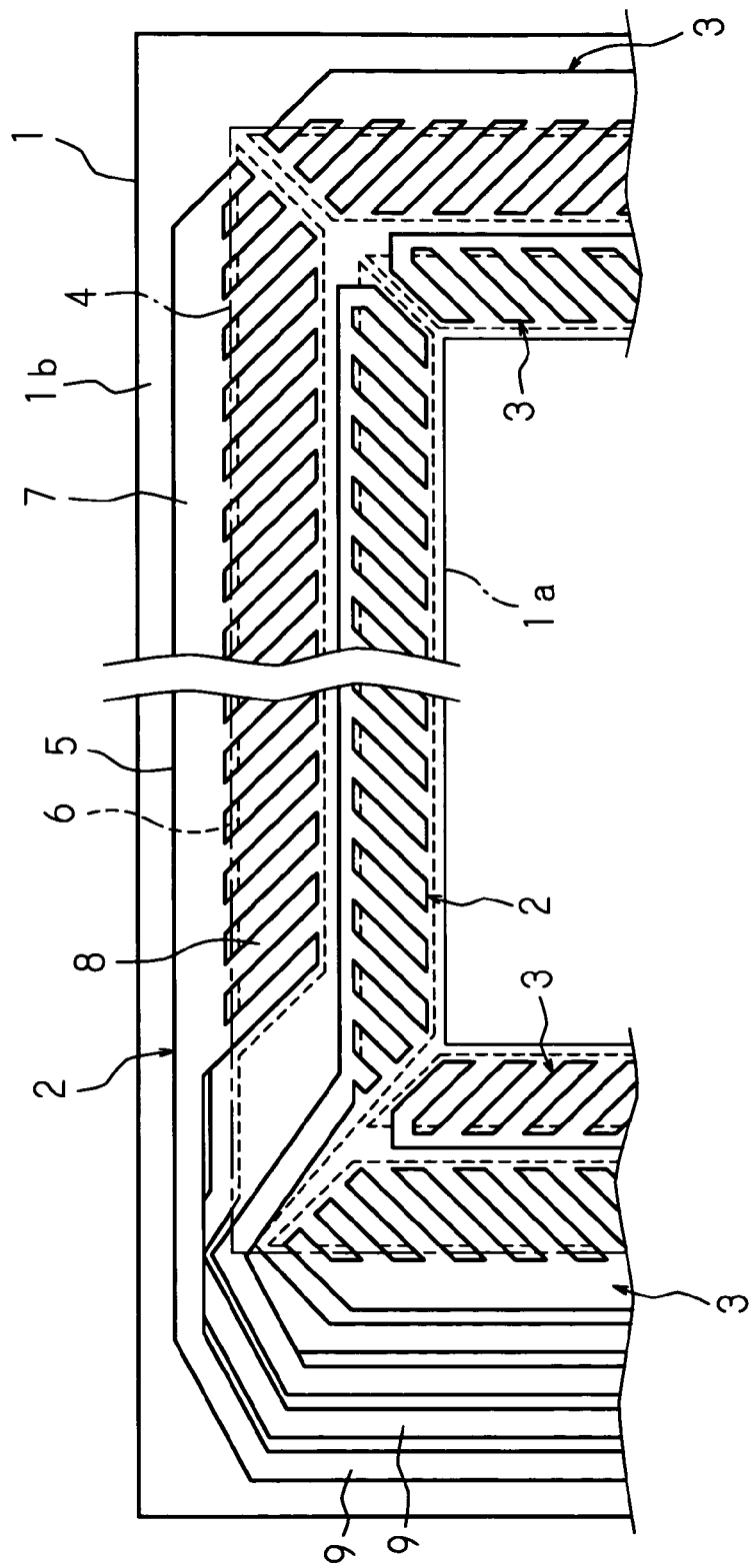
FIG. 24 is an illustration showing a part of the configuration of a touch panel device in the seventh embodiment.

FIG. 24 is an illustration showing a part of the configuration of a touch panel device in the seventh embodiment of the present invention. In FIG. 24, the same parts as in FIG. 6 are designated with the same numerals, and an explanation thereof is omitted. In the seventh embodiment, unlike the configuration shown in FIG. 6, a surface acoustic wave in one direction is excited by one excitation element 2 and received by one receiving element 3. More specifically, in the configuration shown in FIG. 24, the excitation element 2 located on the inner side (lower side in FIG. 24) of the upper side edge excites a surface acoustic wave in a lower right oblique direction, while the excitation element 2 located on the outer side (upper side in FIG. 24) of the upper side edge excites a surface acoustic wave in a lower left oblique direction.

Figure 25:
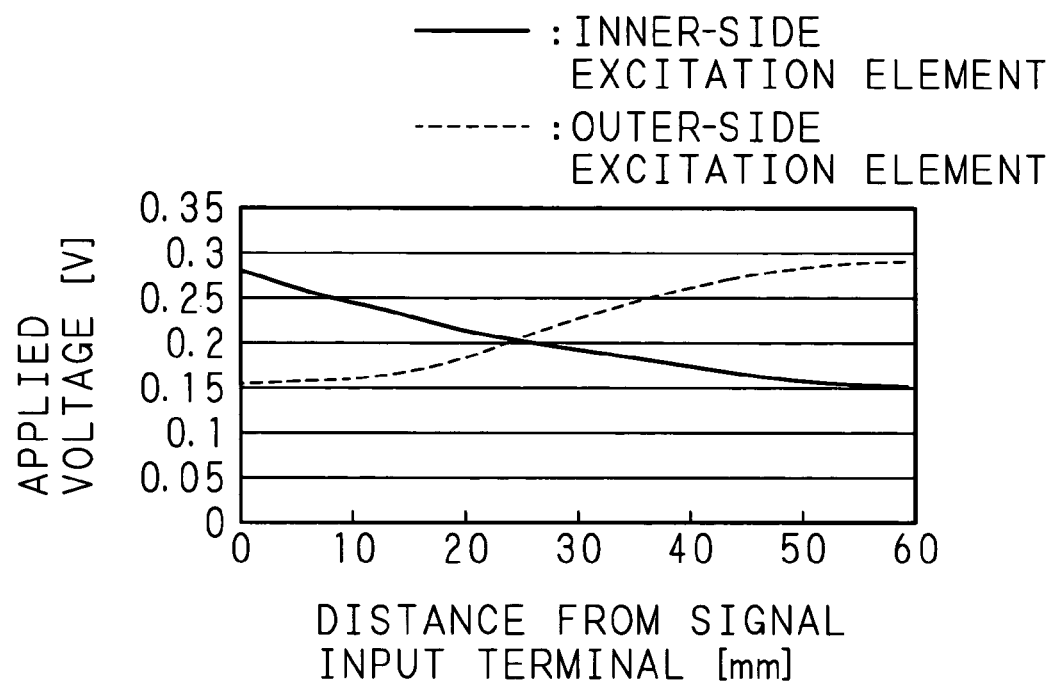
FIG. 25 is a graph showing the voltage distribution in the inner-side and outer-side excitation elements in the seventh embodiment.

The voltage distributions in the inner-side and outer-side excitation elements 2, 2 are controlled independently of each other by adjusting the values of parameters (resistance, capacitance, and inductance) by the techniques as described in the second through sixth embodiments. FIG. 25 is a graph showing the voltage distributions in the two inner-side and outer-side excitation elements 2, 2 in the seventh embodiment. In the inner-side excitation element 2 (solid line), the voltage is higher at the proximal end of the AC voltage signal input where the propagation distance of surface acoustic wave is long, while the voltage is lower at the distal end of the AC voltage signal input where the propagation distance is short. On the other hand, in the outer-side excitation element 2 (dotted line), the voltage is lower at the proximal end of the AC voltage signal input where the propagation distance of surface acoustic wave is short, while the voltage is higher at the distal end of the AC voltage signal input where the propagation distance is long.

Figure 26:
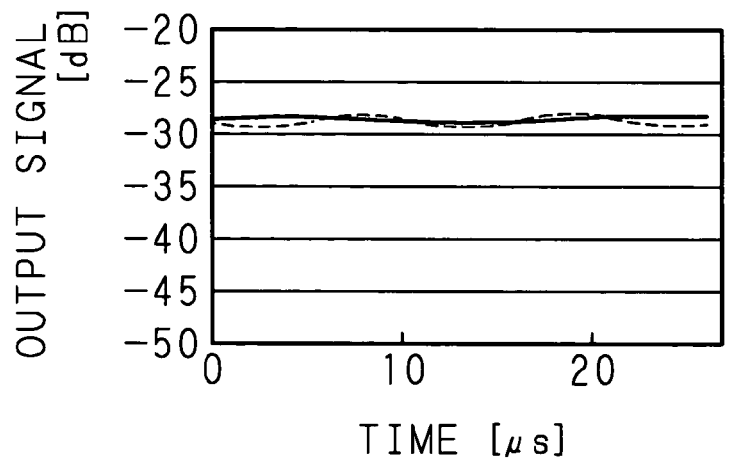
FIG. 26 is a graph showing the output signals of receiving elements corresponding to the inner-side and outer-side excitation elements in the seventh embodiment.

Thus, the propagation loss of surface acoustic wave is compensated by the control of voltage distributions, thereby equalizing the output signal of the receiving element 3. FIG. 26 is a graph showing the output signals of the respective receiving elements 3, 3 corresponding to the inner-side and outer-side excitation elements 2, 2, in which the output signals of the two receiving elements 3, 3 are equalized. For instance, if a complementary explanation is given by taking the inner-side excitation element 2 as an example, on the proximal end (left-end side in FIG. 24) where the propagation distance of surface acoustic wave is long and the propagation loss is large, the large propagation loss is compensated by increasing the internal voltage. Whereas on the distal end (right-end side in FIG. 24), since the propagation loss is small because the propagation distance of surface acoustic wave is short, the internal voltage is set low.

The technique of the seventh embodiment for compensating the propagation loss of surface acoustic wave by control of the voltage distributions is a particularly effective technique for a large touch panel device which is greatly influenced by the propagation loss.

Note that the above-described example illustrates a touch panel device in which the comb-like electrode 5 is formed on the upper surface (front surface) of the piezoelectric body 4 and the plate electrode 6 is formed on the lower surface (rear surface) thereof, but it is, of course, possible to similarly apply the present invention to a touch panel device in which the comb-like electrode 5 is formed on the lower surface (rear surface) of the piezoelectric body 4 and the plate electrode 6 is formed on the upper surface (front surface) thereof.

Figure 1:
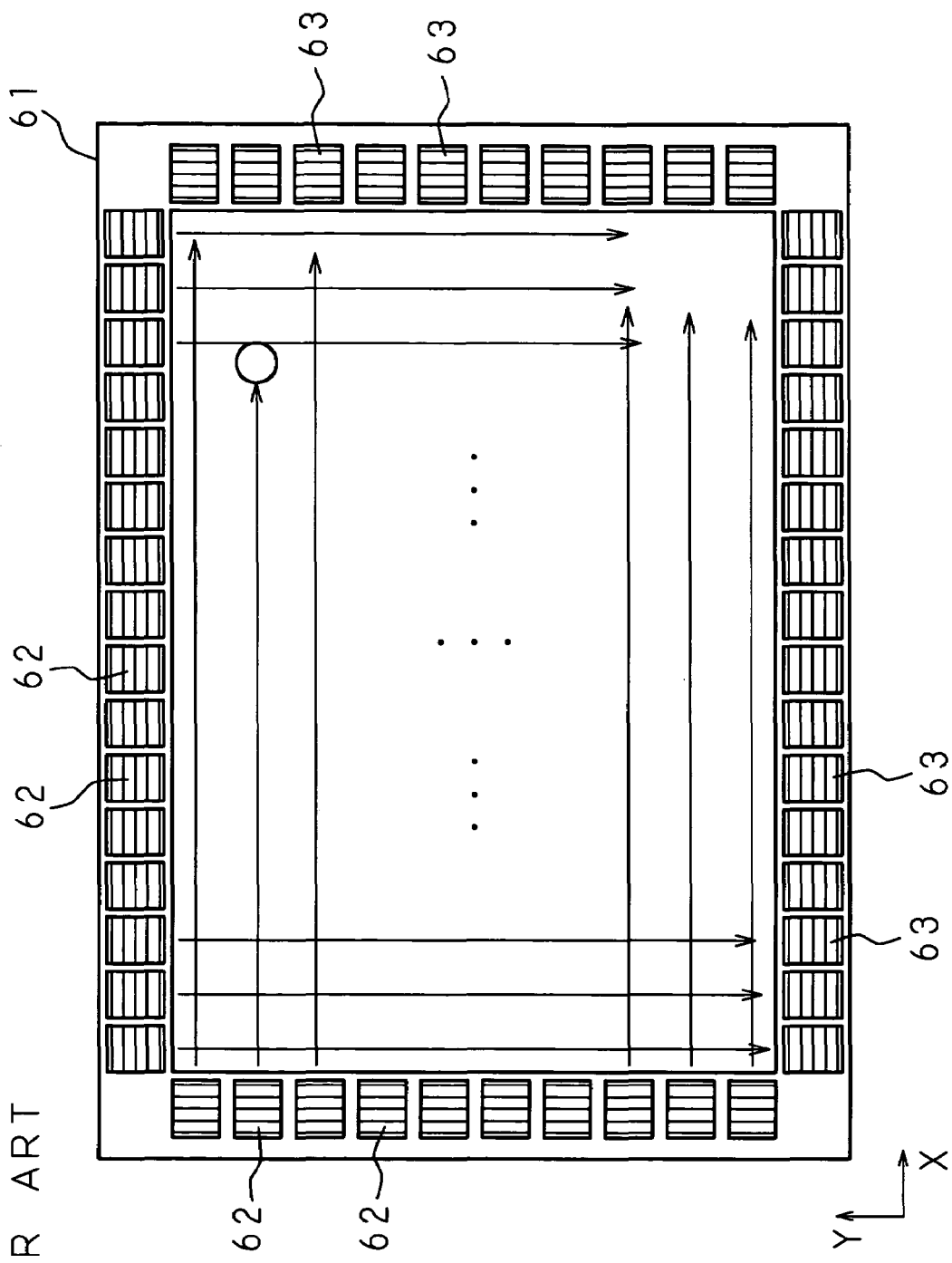
FIG. 1 is an illustration showing the configuration of a conventional touch panel device.
Figure 2:
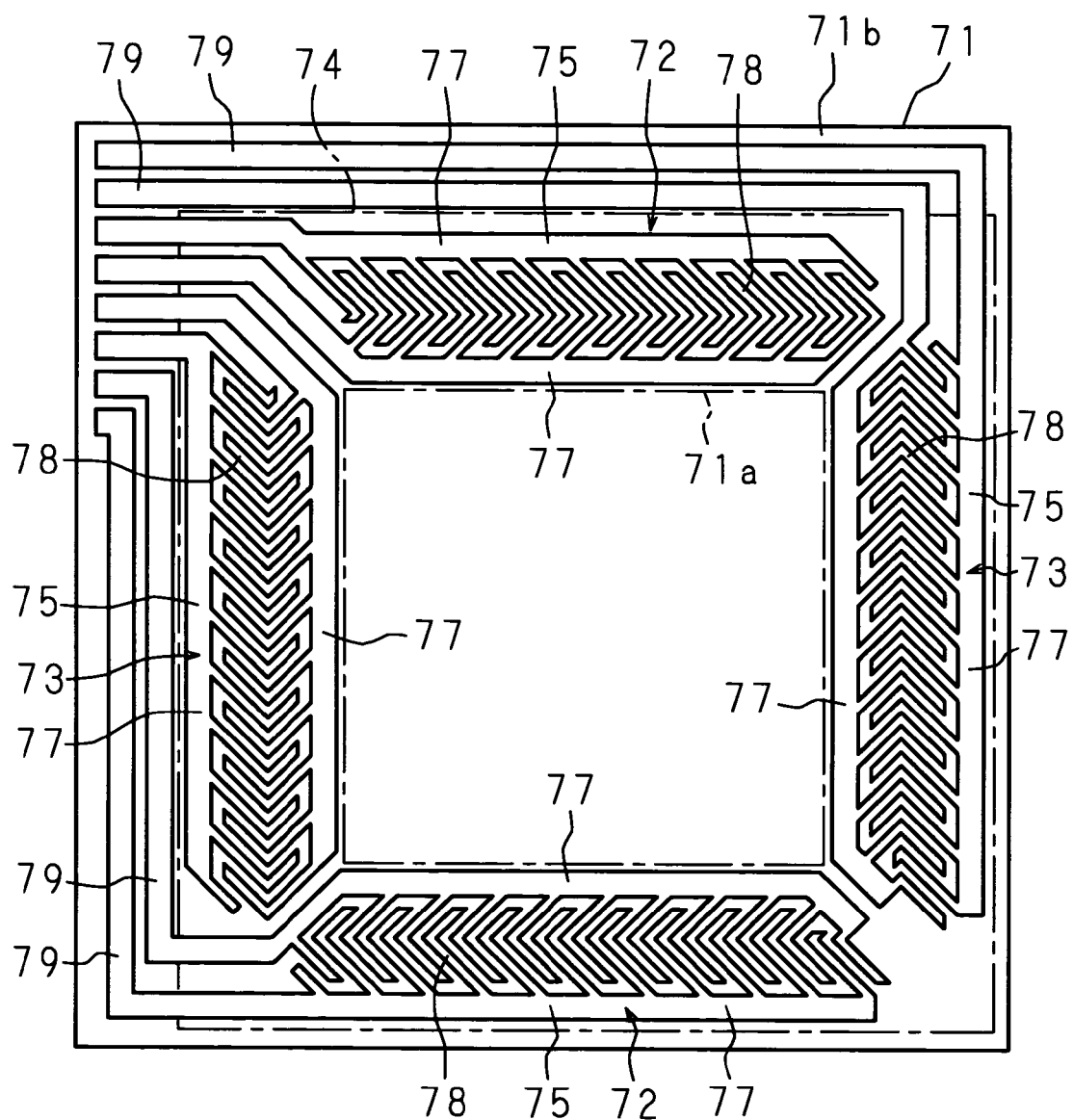
FIG. 2 is an illustration showing the configuration of another conventional touch panel device.
Figure 3:
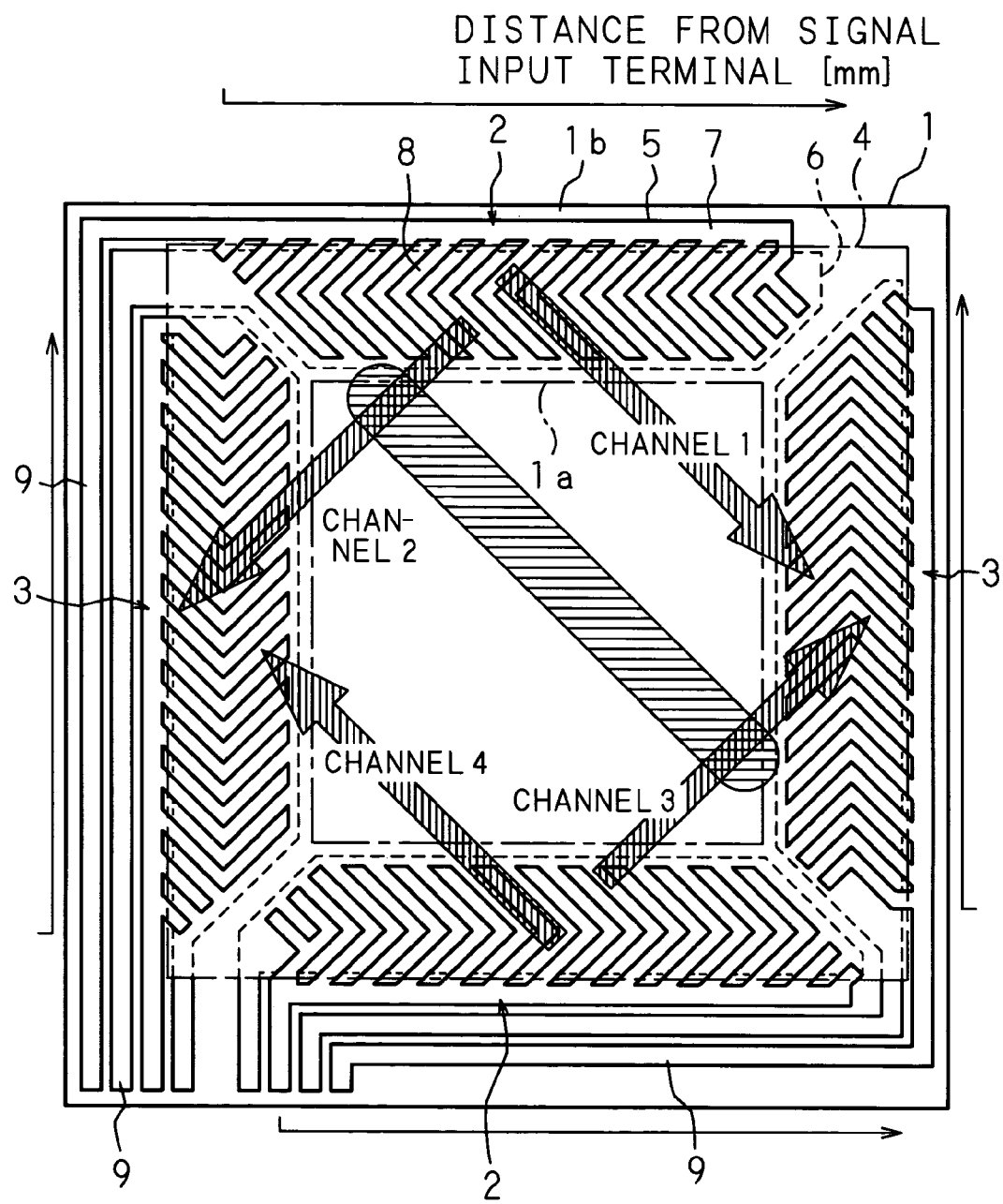
FIG. 3 is an illustration showing the configuration of a touch panel device having SPT electrode structure.
Figure 4:
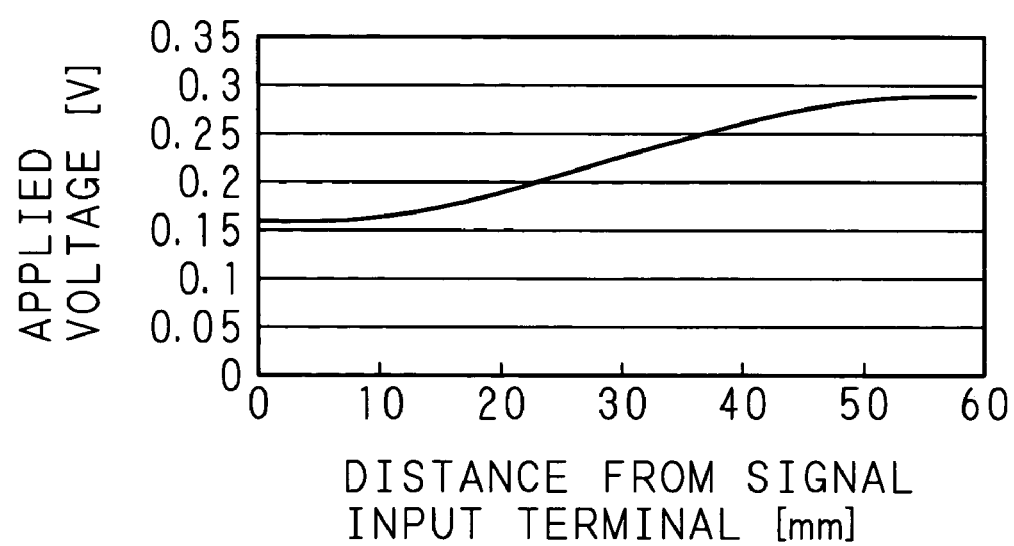
FIG. 4 is a graph showing the voltage distribution in the excitation element and the receiving element of a conventional touch panel device.
Figure 5:
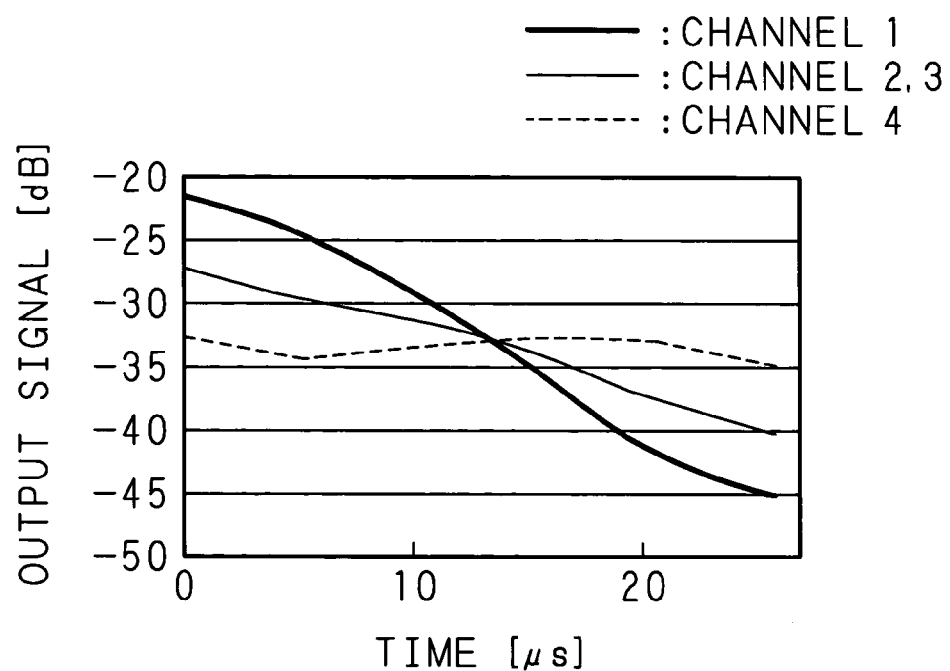
FIG. 5 is a graph showing the output signals of the receiving elements of the respective channels in a conventional touch panel device.

Moreover, although the above-described respective embodiments illustrate examples of a touch panel device having the comb-like electrode 5 and the plate electrode 6 on both surfaces of the piezoelectric body 4, it is, of course, possible to similarly apply the present invention to a touch panel device as shown in FIG. 2.

As described in detail above, since the touch panel of the present invention controls the voltage distributions in the excitation element and in the receiving element when an AC voltage is applied to the excitation element and the receiving element, it is possible to equalize the voltage from the proximal end to the distal end of the AC voltage signal input in the excitation element and in the receiving element and cause the received signals in a plurality of channels to have the same output pattern. As a result, the contact position of an object can be accurately detected.

Furthermore, in the touch panel device of the present invention, since variations in the propagation loss of surface acoustic wave because of propagation of surface acoustic wave in a diagonal direction of the substrate are compensated by control of the voltage distributions in the excitation element and in the receiving element, the problem associated with variations in the propagation loss can be easily solved.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A touch panel device comprising an excitation element having a film-shape piezoelectric body and electrodes for exciting surface acoustic waves, and a receiving element having a film-shape piezoelectric body and electrodes for receiving surface acoustic waves, in a peripheral section of a rectangular substrate to propagate surface acoustic waves from said excitation element to said receiving element and detect a position of an object in contact with said substrate, based on received results by said receiving element, said touch panel device comprising:
   terminal resistances provided at terminal end portions of said electrodes of said excitation element and said receiving element,
   wherein voltage distributions in said excitation element and in said receiving element when an AC voltage is applied to said electrodes of said excitation element and said receiving element are controlled by said terminal resistances.

2. The touch panel device of claim 1, wherein said terminal resistance is integrally formed with said electrode.

3. A touch panel device comprising an excitation element having a film-shape piezoelectric body and electrodes for exciting surface acoustic waves, and a receiving element having a film-shape piezoelectric body and electrodes for receiving surface acoustic waves, in a peripheral section of a rectangular substrate to propagate surface acoustic waves from said excitation element to said receiving element and detect a position of an object in contact with said substrate, based on received results by said receiving element,
   wherein voltage distributions in said excitation element and in said receiving element when an AC voltage is applied to said electrodes of said excitation element and said receiving element are controlled by adjusting a resistance value of said electrodes of said excitation element and said receiving element.

4. The touch panel device of claim 3, wherein the resistance value is adjusted stepwise or continuously.

5. A touch panel device comprising an excitation element having a film-shape piezoelectric body and electrodes for exciting surface acoustic waves, and a receiving element having a film-shape piezoelectric body and electrodes for receiving surface acoustic waves, in a peripheral section of a rectangular substrate to propagate surface acoustic waves from said excitation element to said receiving element and detect a position of an object in contact with said substrate, based on received results by said receiving element,
   wherein voltage distributions in said excitation element and in said receiving element when an AC voltage is applied to said electrodes of said excitation element and said receiving element are controlled by adjusting a capacitance value of said excitation element and said receiving element.

6. The touch panel device of claim 5, wherein the capacitance value is adjusted stepwise or continuously.

7. The touch panel device of claim 1, wherein said excitation element and said receiving element have, as said electrodes, a comb-like electrode formed on one surface of said piezoelectric body, and a plate electrode formed on other surface of said piezoelectric body.

8. The touch panel device of claim 3, wherein said excitation element and said receiving element have, as said electrodes, a comb-like electrode formed on one surface of said piezoelectric body, and a plate electrode formed on other surface of said piezoelectric body.

9. The touch panel device of claim 5, wherein said excitation element and said receiving element have, as said electrodes, a comb-like electrode formed on one surface of said piezoelectric body, and a plate electrode formed on other surface of said piezoelectric body.

10. The touch panel device of claim 1, wherein a pair of said excitation element and receiving element are arranged in the peripheral section in a diagonal direction of said substrate so as to propagate surface acoustic waves in the diagonal direction on said substrate.

11. The touch panel device of claim 3, wherein a pair of said excitation element and receiving element are arranged in the peripheral section in a diagonal direction of said substrate so as to propagate surface acoustic waves in the diagonal direction on said substrate.

12. The touch panel device of claim 5, wherein a pair of said excitation element and receiving element are arranged in the peripheral section in a diagonal direction of said substrate so as to propagate surface acoustic waves in the diagonal direction on said substrate.

13. The touch panel device of claim 7, wherein a pair of said excitation element and receiving element are arranged in the peripheral section in a diagonal direction of said substrate so as to propagate surface acoustic waves in the diagonal direction on said substrate.

14. The touch panel device of claim 8, wherein a pair of said excitation element and receiving element are arranged in the peripheral section in a diagonal direction of said substrate so as to propagate surface acoustic waves in the diagonal direction on said substrate.

15. The touch panel device of claim 9, wherein a pair of said excitation element and receiving element are arranged in the peripheral section in a diagonal direction of said substrate so as to propagate surface acoustic waves in the diagonal direction on said substrate.

* * * * *